United States Patent
Tamoto

(10) Patent No.: US 8,810,896 B2
(45) Date of Patent: Aug. 19, 2014

(54) REWRITABLE RECORDING MEDIUM, IMAGE RECORDING SET, AND IMAGE RECORDING METHOD

(75) Inventor: Nozomu Tamoto, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 221 days.

(21) Appl. No.: 13/431,177

(22) Filed: Mar. 27, 2012

(65) Prior Publication Data

US 2012/0249711 A1 Oct. 4, 2012

(30) Foreign Application Priority Data

Mar. 31, 2011 (JP) ................................ 2011-080798
Feb. 7, 2012 (JP) ................................ 2012-024084

(51) Int. Cl.
G02F 1/167 (2006.01)
G03G 13/22 (2006.01)
G02B 26/02 (2006.01)
G02F 1/139 (2006.01)

(52) U.S. Cl.
CPC .............. *G02F 1/167* (2013.01); *G02B 26/026* (2013.01); *G02F 2001/1678* (2013.01); *G02F 1/1393* (2013.01); *G03G 13/22* (2013.01)
USPC ................. 359/296; 349/33; 345/107; 430/31

(58) Field of Classification Search
CPC ........... G02B 26/00; G02F 1/061; G02F 1/03; G02F 1/133; G02F 1/15
USPC ......... 359/296, 245, 253–254, 290–291, 298, 359/265; 349/33; 345/107; 430/31–32
See application file for complete search history.

(56) References Cited

U.S. PATENT DOCUMENTS

| | | | | |
|---|---|---|---|---|
| 5,000,955 A | * | 3/1991 | Gould et al. | 424/497 |
| 5,288,745 A | * | 2/1994 | Texter et al. | 430/237 |
| 2002/0150827 A1 | | 10/2002 | Kawai et al. | |
| 2005/0276828 A1 | * | 12/2005 | Grissett et al. | 424/401 |
| 2007/0002428 A1 | | 1/2007 | Liu et al. | |
| 2007/0057908 A1 | | 3/2007 | Jacobson | |
| 2009/0073351 A1 | * | 3/2009 | Kakinuma et al. | 349/89 |
| 2011/0286081 A1 | | 11/2011 | Jacobson | |

FOREIGN PATENT DOCUMENTS

| | | |
|---|---|---|
| JP | 50-15115 | 6/1975 |
| JP | 2-196227 | 8/1990 |
| JP | 2551783 | 8/1996 |
| JP | 2000-62316 | 2/2000 |
| JP | 2000-198228 | 7/2000 |
| JP | 2001-301325 | 10/2001 |
| JP | 2003-91022 | 3/2003 |
| JP | 2003-149691 | 5/2003 |
| JP | 2007-11342 | 1/2007 |
| JP | 2007-140367 | 6/2007 |
| JP | 2007-286124 | 11/2007 |

(Continued)

*Primary Examiner* — Dawayne A Pinkney
(74) *Attorney, Agent, or Firm* — Oblon, Spivak, McClelland, Maier & Neustadt, L.L.P.

(57) ABSTRACT

A rewritable recording medium including: a base material; and an image recording layer enclosed by the base material, wherein the image recording layer contains: electrophoretic particles, magnetophoretic particles, or both of the electrophoretic particles and the magnetophoretic particles; a dispersion medium; and a thermoreversible gelling agent, and wherein the dispersion medium is in contact with the base material, and wherein image recording and image erasing can be repeatedly performed on the rewritable recording medium by an external image recording device.

15 Claims, 7 Drawing Sheets

(56) References Cited

FOREIGN PATENT DOCUMENTS

| | | |
|---|---|---|
| JP | 4114374 | 4/2008 |
| JP | 2008-139632 | 6/2008 |
| JP | 4168556 | 8/2008 |
| JP | 4410135 | 11/2009 |
| JP | 2010-2933 | 1/2010 |
| WO | 02/079869 A1 | 10/2002 |

* cited by examiner

REWRITABLE RECORDING MEDIUM, IMAGE RECORDING SET, AND IMAGE RECORDING METHOD

BACKGROUND OF THE INVENTION

1. Field of the Invention

The present invention relates to a rewritable recording medium, an image recording set, and an image recording method for writing by an image recording device to be externally driven.

2. Description of the Related Art

In recent years, electronic paper that has visibility and portability close to that of a printed material, does not require a backlight, and is low in power consumption, thin, and lightweight, has been put into practical use and gained attention. Electronic paper is classified into internally-driven paper-like display (hereinafter referred to as PLD) that includes a drive element inside and can display images by itself, and externally-driven rewritable paper using a recording medium on which writing is performed by a printer. The rewritable paper includes all recording media such as paper and sheets on which rewriting can be repeatedly performed, and is synonymous with a rewritable recording medium in the present invention.

Various types of electronic paper have been proposed, and among them, as a PLD, an electrophoretic type that performs display by changing an optical reflectance by causing white and/or colored particles charged in a liquid to migrate to the surface side or the opposite direction of a display medium by an electric field is known as a most practical type. For example, a display or recording device is disclosed which is configured so that by applying an electric field to a mixed multi particle dispersion system including particles that migrate in directions opposite to each other due to an electric field, certain particles are optically shielded to change the optical reflection characteristics of the dispersion system (see Japanese Patent Application Publication (JP-B) No. 50-15115).

In addition, an electrophoretic display device is disclosed in which a large number of microcapsules in which a dispersion system obtained by dispersing electrophoretic particles in a colored dispersion medium is encapsulated are provided between a pair of counter electrode plates (see Japanese Patent (JP-B) No. 2551783).

Further, an ink is disclosed in which by applying an electric field to microcapsules including first particles and second particles with polarity reverse to the polarity of the first particles, either the first particles or the second particles are caused to migrate to the surface (see JP-B No. 4410135). Thus, the electrophoretic type, particularly, a microcapsule type electrophoretic type has already been put into practical use as electronic paper, and has gained much attention.

These electrophoretic electronic papers can retain displayed content without requiring electric power after displaying the content once, and this is recognized as one of the advantages, however, there are problems in image retainability in actuality because if an image is left without application of an electric field after it is displayed, the image density changes with time, and if the image is influenced by static electricity and pressure, from the outside, the image quality is deteriorated.

To solve these problems, for example, a method for controlling a solubility parameter in a dispersion medium by making walls of microcapsules from a graft copolymer (see Japanese Patent Application Laid-Open (JP-A) No. 2007-286124) and a method for dissolving or dispersing a polymer that does not increase viscosity in a suspending fluid (see JP-A No. 2010-002933), are disclosed.

These technologies are effective for improving the image retainability required for PLD. However, these are not sufficient for realizing image retainability required for rewritable paper.

The reason for this is differences in structure and purpose of use between the PLD and the rewritable paper. The PLD is provided with a substrate having conductive layers as electrodes above and below a display layer that is a region in which electrophoretic particles move and covered by a housing, so that it is hardly influenced from the outside, and a voltage can be applied thereto as appropriate, and accordingly, the PLD can retain an image.

However, the rewritable paper is not covered by a housing and is easily influenced from the outside, and in addition, a recording medium does not include an element or power source for applying a voltage, so that it is impossible to retain an image for a long period of time from the outside. Although the influence from the outside can be reduced by a covering by a protective layer, in some cases, this is not sufficient as an effect of enhancing image retainability, and the advantages such as flexibility and low cost required as a rewritable paper are lost.

Rewriting frequency of the PLD is high in use, so that the extent of demand for image retainability is not so high, however, the rewritable paper is highly demanded to retain records for a long period of time like paper, so that semipermanent image retainability must be realized.

As a technology for significantly enhancing image retainability, a number of methods for fixing colored particles have been disclosed in which the viscosity of a dispersion medium in which electrophoretic particles are dispersed is controlled by temperature, and after recording is performed by reducing the viscosity by heating, cooling is applied to fix colored particles.

For example, the disclosed methods are a method using resin, rubber, solder, or synthetic wax that are solids at normal temperatures and are softened by heating or a solvent (see JP-B No. 50-15115), a method in which two phases of liquid and solid coexist in a dispersion liquid containing electrophoretic particles, a dispersion medium, a dye, and a dispersant when the dispersion medium is at a normal temperature, and when the electrophoretic particles electrophoretically migrate, the solid phase is dissolved and the two phases are converted into a uniform liquid phase (see JP-B No. 4168556), a method in which a heat-meltable substance that is solid when it is not heated and becomes liquid when it is heated, specifically, waxes, saturated fatty acid, higher alcohols, and electrophoretic fine particles are encapsulated into microcapsules (see JP-A No. 2001-301325), a method using a mixture that has fluidity at an electrophoretic operating temperature, and becomes an optically opaque solid at a temperature lower than the electrophoretic operating temperature, specifically, a mixture of a substance selected among long-chain alcohols, phenols, aromatic ketones, decanes, and dodecanes, and a substance selected among paraffin, solders, waxes, and saturated hydrocarbons (see JP-B No. 4114374), a method using higher paraffin hydrocarbons, solders, waxes, or aromatic hydrocarbons as a dispersion medium that is solid at normal temperatures and becomes liquid by heating (see JP-A No. 2003-91022), and a method in which a dispersion medium is composed mostly of rice wax and contains a surfactant (see JP-A No. 2007-140367).

Thus, a dispersion medium that is solid at normal temperatures and becomes liquid when being heated is very effective for improvement in image retainability because electrophoretic particles are fixed by cooling after recording.

However, in these technologies, waxes, solders, and saturated fatty acid, are added to the dispersion medium, so that the temperature responsiveness in transition between the solid state and the liquid state is low, the rewriting speed decreases, and the viscosity of the dispersion medium is not sufficiently lowered even by heating, the contrast deteriorates, and image quality deteriorates due to repeated rewriting, so that satisfactory performance is not obtained.

A method using a dispersion medium that turns into a gel in a PLD is disclosed. For example, a thermal writing system is disclosed which includes a dispersion medium that turns into a gel and a sol (liquid) reversibly according to temperature and electrophoretic particles, and locally causes the electrophoretic particles to migrate by locally converting the dispersion medium into a sol (see JP-A No. 02-196227).

However, with this technology, as a dispersion medium that turns into a gel and a liquid, specifically, a high-molecular substance whose solvent becomes a poor solvent is used, however, the high-molecular substance is dissolved when the temperature of the solvent is high, and the high-molecular substance becomes insoluble and turns into a gel when the temperature is low, so that the high-molecular substance itself does not have thermal reversibility.

Therefore, the temperature responsiveness in transition between a gel and a liquid is low, and liquefaction is local, so that the display speed and image quality are not satisfactory.

In addition, a display gel for electrophoretic display including a dispersion medium, white particles, colored particles, and a gelling agent has been disclosed (see JP-A No. 2003-149691).

However, in this technology, although a gelling agent is contained in the dispersion medium, thermal reversibility is not described, and it is described that, due to gelatinization, the dispersion medium is substantially equally divided into continuous and/or discontinuous minute regions and turns into a gel, and the particles electrophoretically migrate by the action of an electric field in the dispersion medium in a gel state. Therefore, the problems in the rewriting speed and contrast are not solved, and a solution to the problems is still not attained.

On the other hand, a display medium for electrophoretic display containing a liquid system, a set of a thermoreversible gelling agent and colored particles in the PLD has been disclosed (see JP-A No. 2007-11342). With this technology, by containing the thermoreversible gelling agent, the display medium turns into non-gel and is reduced in viscosity at a temperature close to or higher than a melting point of the gelling agent, so that images can be formed in a display device.

When the display device is cooled after an image is formed, the medium turns into a gel, so that even without applying an electric field, the image is stably maintained. In the method using a thermoreversible gelling agent, the gelling agent itself causes gelatinization, so that the temperature responsiveness is higher and more stable than in the conventional technologies in which waxes and solders are added or gelatinization is controlled by solubility of a high-molecular substance in a solvent, so that this method is very excellent for enhancing image retainability.

However, as long as the thermoreversible gelling agent is also controlled by temperature, the influence of reduction in rewriting speed on use with frequent image rewriting increases. As described above, this technology using a thermoreversible gelling agent is premised on that it is used for a display device having two parallel transparent conductor electrode panels, that is, a PLD, so that the disadvantage of deterioration in display responsiveness becomes greater than the advantage of semipermanent image retainability by using a thermoreversible gelling agent. In addition, a heating unit and a cooling unit must be provided inside the device, so that the thickness and weight of the PLD increase, and this is also a big disadvantage.

Therefore, the effect of use of the thermoreversible gelling agent has not been sufficiently utilized, and has not been applied to a PLD in actuality.

The PLD mainly used as a conventional display has currently been largely developed and significantly advanced, however, the advancement of the rewritable paper mainly used as a conventional paper has been slightly delayed as compared with the PLD.

However, there is a need for paper different from that for a display, and the spread of rewritable paper that can be handled in the same manner as paper has been expected.

Problems of rewritable paper exist in image retainability, image quality, cost, safety, flexibility, and toughness (thinning, reduction in weight).

It is considered that the need for image retainability required for rewritable paper is higher than that for PLD as described above. In order to perform rewriting, the PLD is configured as a device, so that the rewriting frequency is naturally high. Therefore, it does not necessarily require semipermanent image retainability. On the other hand, the rewritable paper is rewritable, however, on the assumption that it is used instead of paper, high image retainability is required. In addition, rewritable paper that is not covered by a housing is more easily influenced by static electricity and pressures from the outside than the PLD covered by a housing, so that this is a big problem in enhancing image retainability.

Therefore, image retainability is a very important issue for rewritable paper rather than for PLD.

For image quality required for rewritable paper, in particular, white and black contrast ratio is important. A printed material has a very high contrast ratio, so that its visibility is high, however, electronic paper is insufficient particularly in white reflectance, and the reality is that the contrast of the electronic paper lags behind that of a printed material. One of the possible reasons for this is the influence of microcapsules enveloping electrophoretic particles and a dispersion medium. The used microcapsules have high transparency, however, it cannot be denied that microcapsules are the cause of deterioration of the reflectance as long as the microcapsules cover electrophoretic particles. In addition, if the microcapsules are reduced in diameter, the regions of capsule walls in which recording cannot be performed increases, so that the image quality becomes much lower. Microencapsulation of electrophoretic particles and a dispersion medium enables these to be handled as electronic ink, however, in terms of image quality, it is better that microcapsules are not used.

The cost required for the rewritable paper is one of the biggest issues that hinder its spread. The PLD is mainly used as a conventional display, so that an increase in cost is allowed to some extent, however, rewritable paper is mainly used as conventional paper, so that high cost is a fatal issue. It is assumed that due to the rewritability, the unit cost per one rewritable paper becomes higher than the unit cost per one paper, however, a value of the rewritable paper, different from the value of a display, can be found in its capability of mass-recording and capability of being distributed like paper, so that if the unit cost excessively increases, the value of the rewritable paper becomes lower.

For electrophoretic type PLD, microencapsulation technology is relatively advantageous in cost as compared with conventional methods, however, for rewritable paper that replaces paper, the cost of microencapsulation technology is not on a practical level. Further, a configuration including lamination of a conductive layer and a protection layer as electrodes in addition to a recording layer in which electrophoretic particles are dispersed costs almost as much as a simple display, so that the value as rewritable paper cannot be found.

An important point in safety required for rewritable paper is prevention of leakage of organic solvents. Organic solvents are used in electrophoretic type and/or magnetophoretic type electronic paper. The risk of leakage and contact of organic solvents with humans is low even when the electronic paper is broken and if it is covered by a housing like PLD, however, in the case of rewritable paper, the risk of leakage and contact of organic solvents with humans is high when the rewritable paper is broken because it is not covered by a housing.

Therefore, in order to realize electrophoretic type and/or magnetophoretic type rewritable paper, a safety measure for preventing humans from coming into contact with organic solvents and inhaling the organic solvents is essential. In addition, microcapsules may contain formaldehyde, and this is also a big issue from the viewpoint of safety.

Concerning flexibility required for the rewritable paper, the PLD has also been developed to be made flexible, and for rewritable paper that has been demanded as a replacement for paper, flexibility is a necessary characteristic. To make the rewritable paper flexible, the recording medium itself must be a lightweight thin film, and flexibility is also important for enhancing toughness. To spread the rewritable paper as a replacement for paper, it is very important to add a value different from the value of PLD by making the rewritable paper thinner or lighter in weight like paper and increasing flexibility and toughness.

As described above, as an externally-driven rewritable recording medium on which writing is performed by a printer, provision of an externally-driven rewritable recording medium that includes image retainability, image quality, low cost, safety, and flexibility has been demanded.

SUMMARY OF THE INVENTION

An object of the present invention is to solve the conventional problems and achieve the following object. That is, an object of the present invention is to provide an externally-driven rewritable recording medium that includes image retainability, image quality, low cost, safety, and flexibility.

Means for solving the problems is as follows. Specifically, a rewritable recording medium according to the present invention includes:
a base material; and
an image recording layer enclosed by the base material,
wherein the image recording layer contains:
electrophoretic particles, magnetophoretic particles, or both of the electrophoretic particles and the magnetophoretic particles;
a dispersion medium; and
a thermoreversible gelling agent, and
wherein the dispersion medium is in contact with the base material, and
wherein image recording and image erasing can be repeatedly performed on the rewritable recording medium by an external image recording device.

The present invention can solve the conventional problems, and provide an externally-driven rewritable recording medium including image retainability, image quality, low cost, safety, and flexibility.

Figure 1:
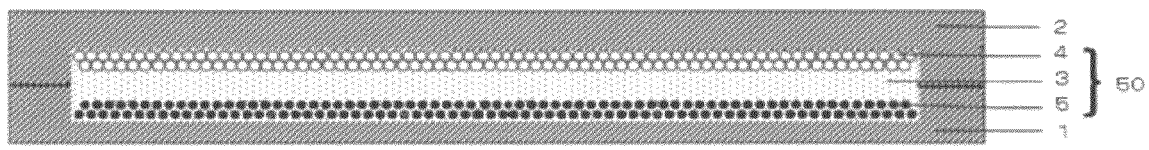
FIG. 1 is a schematic view showing an example of a rewritable recording medium according to the present invention.

DETAILED DESCRIPTION OF THE INVENTION (Rewritable Recording Medium)

A rewritable recording medium according to the present invention includes a base material and an image recording layer enclosed by the base material, preferably includes a spacer, and further includes other members as appropriate.

Unlike an internally-driven paper-like display (PLD) that includes a drive element inside and can display images by itself, the rewritable recording medium is an externally-driven recording medium on which image recording and image erasing can be repeatedly performed by an external image recording device, and is synonymous with the rewritable paper. That is, images are recorded on and erased from the rewritable recording medium by an external image recording device that is not included inside the rewritable recording medium. Therefore, the rewritable recording medium does not necessarily need an electrode (for example, a transparent electrode) to be used for recording images.

The image recording layer contains at least one of electrophoretic particles and magnetophoretic particles, a dispersion medium, and a thermoreversible gelling agent.

The electrophoretic particles are particles that migrate inside a dispersion medium due to an electric field when the electric field is applied from the outside.

The magnetophoretic particles are particles that migrate inside a dispersion medium due to a magnetic field when the magnetic field is applied from the outside.

The dispersion medium is a dispersion medium that disperses at least one of the electrophoretic particles and magnetophoretic particles.

The thermoreversible gelling agent is a material that converts the dispersion medium into a sol (liquid) at a temperature higher than a certain temperature, converts the dispersion medium into a gel (solid) at a temperature equal to or lower than the certain temperature, and can reversibly cause sol-gel transition according to the temperature.

The dispersion medium is in contact with the base material.

The rewritable recording medium contains the thermoreversible gelling agent that converts the dispersion medium into a gel at the time of image browsing and image saving at a normal temperature such as a room temperature, and converts the dispersion medium into a liquid at the time of image recording (writing) at a temperature higher than in the case of image browsing and image saving at a normal temperature in the image recording layer. Accordingly, at the time of image browsing and image saving, the dispersion medium can be converted into a gel, so that for image browsing and image saving, electrophoretic particles and magnetophoretic particles can be restrained from moving in the image recording layer, image quality changes during saving for a long period of time can be reduced, and even when the recording medium is influenced by static electricity and pressures from the outside, high image retainability is obtained. At the time of recording (writing), the dispersion medium turns into a liquid by heating, so that for recording by the image recording device, electrophoretic particles and magnetophoretic particles are enabled to freely move in the image recording layer, so that repeated image recording is possible.

For a PLD required to have a high writing speed as a display device, the display speed with use of a thermoreversible gelling agent is not sufficient, however, to a rewritable recording medium required to be used like paper, the recording (writing) speed with use of a thermoreversible gelling agent can be sufficiently applied.

As in the case of conventional technology, when the image recording layer containing the thermoreversible gelling agent is used as an internally-driven PLD that includes a drive element inside and can display images by itself, a heating unit or a cooling unit must be installed inside the display in addition to a display drive unit configured to apply an electric field, so that the display increases in size and weight, and the temperature must be raised or lowered each time of rewriting, so that the display speed becomes lower and the display contrast ratio becomes insufficient, which has been a problem. However, a rewritable recording medium according to the present invention is a recording medium on which images are recorded not by the PLD but by an external image recording device that is not included inside, so that it is not necessary to provide heating and cooling units in the recording medium itself and these units are able to be installed in a different image recording device than the recording medium, so that the problems of a decrease in display speed and insufficient display contrast ratio occurring in a PLD are solved.

Therefore, for the rewritable recording medium, the decrease in display speed due to the use of a thermoreversible gelling agent that is disadvantageous for the PLD is not a problem, and in addition, a great advantage of realization of semipermanent image retainability can be obtained by use of a thermoreversible gelling agent.

The rewritable recording medium according to the present invention includes the image recording layer, and the image recording layer contains the dispersion medium. The dispersion medium is in contact with the base material. Specifically, unlike a microcapsule type, at least one of the electrophoretic particles and magnetophoretic particles are not covered by microcapsules, so that the reflectance is increased and an image with high visibility is obtained. In addition, not only the density of white but also the density of black is enhanced, so that a high-contrast image can be obtained. Specifically, the rewritable recording medium is excellent in image quality.

In the rewritable recording medium according to the present invention, the dispersion medium is in contact with the base material, so that the structure in which the dispersion medium is encapsulated into microcapsules as in the conventional technology is not necessary. Therefore, it is structurally simple and easily manufactured. This is because the thermoreversible gelling agent is contained in the image recording layer, and for example, a material for forming the image recording layer, containing the dispersion medium that is a liquid at a temperature higher than a room temperature (in detail, at least one of the electrophoretic particles and magnetophoretic particles, the dispersion medium, and the thermoreversible gelling agent) is prepared and provided onto the base material by means of application, and thereafter, converted into a gel by lowering the temperature to the room temperature, whereby easily forming the image recording layer. By providing the material for forming the image recording layer onto the base material and converting it into a gel, the base material serves as a substrate, so that it becomes unnecessary to provide a substrate separately. Therefore, the rewritable recording medium can be manufactured by a simple method such as roll-to-roll processing. Further, this configuration is realized, so that it becomes possible to provide an electrode on the image recording device, and an electrode is unnecessary on the rewritable recording medium.

Thus, the rewritable recording medium according to the present invention has a simple structure that does not need covering by microencapsulation of electrophoretic particles and provision of a conductive layer as an electrode on the substrate unlike the conventional technology, and a simple method such as roll-to-roll processing is applicable thereto, and further, the rewritable recording medium can be manufactured through fewer steps, so that a significant cost reduction is realized.

In the rewritable recording medium according to the present invention, the dispersion medium is a gel during image browsing and image saving, that is, in a normal-temperature environment in which the recording medium is used. Therefore, even if the rewritable recording medium is broken, it is safe without the risk of scattering of the dispersion medium. In addition, microcapsules are not necessary, so that the problem of formaldehyde that may be contained in microcapsules is also solved.

In the rewritable recording medium according to the present invention, the dispersion medium is a gel during image browsing and image saving, that is, in a normal-temperature environment in which the rewritable recording medium is used. Therefore, the image recording layer has flexibility, so that the recording medium can become flexible. In addition, the rewritable recording medium has no electrode, so that it can be made thinner and lighter in weight, and in this regard, it is excellent in flexibility and toughness.

<Base Material>

The material of the base material is not particularly limited and can be selected as appropriate according to the purpose, and is, for example, synthetic resin, plastic such as natural resin, paper, synthetic paper, wooden board or metal board. In view of flexibility and transparency, synthetic resin is preferable.

The synthetic resin is not particularly limited and can be selected as appropriate according to the purpose, and is, for example, polyethylene, chlorinated polyethylene, ethylene-vinyl acetate copolymer, ethylene-ethyl acrylate copolymer, polypropylene, polybutadiene, AS resin (acrylonitrile-styrene copolymer), ABS resin (acrylonitrile-butadiene-styrene copolymer), methyl methacrylate resin, vinyl chloride resin, vinyl chloride-vinyl acetate copolymer, vinyl chloride-vinylidene chloride copolymer, vinyl chloride-acrylic ester copolymer, vinyl chloride-methacrylate copolymer, vinyl chloride-acrylonitrile copolymer, ethylene-vinyl alcohol-vinyl chloride copolymer, propylene-vinyl chloride copolymer, vinylidene chloride resin, vinyl acetate resin, methacrylate-styrene copolymer, polybutylene resin, methyl methacrylate-butadiene-styrene copolymer, polyvinyl alcohol, polyvinyl formal, cellulose-based resin, polyamide-based resin, polyacetal resin, polycarbonate resin, urethane-based resin, polyester resin (polyethylene terephthalate resin, polybutylene terephthalate resin), polyphenylene oxide resin, polysulfone resin, polyamideimide resin, polyamino bismaleimide resin, polyether sulfone resin, polyphenylene sulfone resin, polyarylate resin, grafted polyphenylene ether resin, polyether ether ketone resin, polyether imide resin, polytetrafluoroethylene resin, polyfluoroethylene propylene resin, tetrafluoroethylene-perfluoroalkoxy ethylene copolymer, ethylene-tetrafluoroethylene copolymer, polyvinylidene fluoride, polychlorotrifluoroethylene, fluorine-based resin such as fluorine-contained rubber, silicone resin, silicone-based resin such as silicone rubber. One kind among these may be used alone, or two or more kinds may be used together.

For the purpose of enhancing scratch resistance and wear resistance of the rewritable recording medium, the base material may be a resin that is cured by light, heat, and electron beam. This resin is, for example, photo-curable resin or thermosetting resin.

Among these, polyethylene terephthalate resin is preferable because it has high transparency and flexibility, and has excellent heat resistance and film-forming properties in practical use.

The base material encloses the image recording layer, and as a mode thereof, for example, a first base material and a second base material are used as the base material, and the mode in which an image recording layer is sandwiched by the first base material and the second base material is included. In this case, the material of the first base material and the material of the second base material may be the same or different from each other.

The shapes of the first base material and the second base material are not particularly limited and can be selected as appropriate according to the purpose, and are, for example, sheet-like.

The base material is preferably transparent at least on the side to be viewed. On the other hand, the surface on the side opposite to the side to be viewed may be transparent, translucent, or opaque. By making the surface on the side opposite to the side to be viewed opaque (for example, white, black, or monochrome), a high contrast ratio is obtained, and the visibility is enhanced. In this case, for example, a transparent base material is used as the first base material to be disposed on the side to be viewed, and a translucent or opaque base material is used as the second base material to be disposed on the surface on the side opposite to the first base material, and accordingly, the rewritable recording medium can be fabricated. As the opaque base material, paper and synthetic paper can also be used, and are effective.

As a method for making the base material opaque, a method is effective in which a filler such as titanium oxide and carbon black is contained in the base material. In detail, for example, by containing titanium oxide in the base material, a white base material is obtained. By containing carbon black in the base material, a black base material is obtained. Other than these, various conventionally known pigments and fine particles can also be contained in the base material. As another method for making the base material white, a method in which a large number of flat voids are formed in the base material, and the base material is made white by multiple reflection occurring in the interfaces of the flat voids, is also effective.

A mean thickness of the base material is not particularly limited and can be selected as appropriate according to the purpose, however, it is preferably 10 μm to 1,000 μm, more preferably 20 μm to 500 μm, and particularly preferably 30 μm to 200 μm. When the base material is configured by using the first base material and the second base material, mean thicknesses of the respective first base material and second base material are preferably 5 μm to 500 μm more preferably 10 μm to 250 μm, and particularly preferably 15 μm to 100 μm. In this case, the mean thickness of the first base material and the mean thickness of the second base material may be the same as each other or different from each other.

If the mean thickness of the base material is less than 10 μm, a crease or fold is formed, and at this portion, an image defect may occur. If the mean thickness of the base material is larger than 1,000 μm, the flexibility and portability (thinness and lightweight) may become insufficient, or a high applied voltage and applied magnetic field may be required for recording (writing).

<Image Recording Layer>

The image recording layer contains at least electrophoretic particles and/or magnetophoretic particles, a dispersion medium, and a thermoreversible gelling agent, and further contains other components as appropriate.

The image recording layer is enclosed by the base material.

The shape of the image recording layer is not particularly limited and can be selected as appropriate according to the purpose, and is, for example, tabular.

The image recording layer preferably has a cross-sectional in which a plurality of substantially circular shapes, a plurality of substantially oval shapes, or a plurality of the substantially circular shapes and the substantially oval shapes are arranged, for preventing excessive deformation with respect to an external force, preventing electrophoretic particles and magnetophoretic particles from being biased, and retaining image quality and stability without the need of a spacer. In this case, a preferable cross-section of the image recording layer is a collective shape of substantially circular shapes and oval shapes; that is, the image recording layer preferably has a cross-sectional in which a plurality of substantially circular shapes, a plurality of substantially oval shapes, or a plurality of the substantially circular shapes and the substantially oval shapes are arranged, however, without limiting to this, the cross-section is not particularly limited and can be selected as appropriate according to the purpose. In the case of this shape, the surface that comes into contact with the image recording layer of the base material preferably conforms with the shape of the image recording layer. The section is, for example, a section cut along the thickness direction of the image recording layer.

—Electrophoretic Particles and Magnetophoretic Particles—

The electrophoretic particles are not particularly limited and can be selected as appropriate according to the purpose as long as they are particles capable of electrophoretically migrating in the dispersion medium in liquid form according to application of an electric field, and are, for example, organic pigments and inorganic pigments, and the kinds to be selectively used according to colors of images to be recorded on the rewritable recording medium.

White electrophoretic particles are, for example, metal oxide such as titanium oxide, zinc oxide, antimony oxide, aluminum oxide, silica, barium titanate, and barium sulfate.

Black electrophoretic particles are, for example, carbon black, aniline black, titanium black, furnace black, lamp black and black iron oxide.

Red electrophoretic particles are, for example, rhodamine 6G lake, dimethylquinacridone, watching red, lake red C, brilliant carmine 6B, rose Bengal, rhodamine B, alizarin lake, lithol red, permanent red 4R, and benzidine red.

Yellow electrophoretic particles are, for example, chrome yellow, benzidine yellow, hansa yellow, naphthol yellow, molybdenum yellow, quinoline yellow and tartrazine.

Blue electrophoretic particles are, for example, phthalocyanine blue, methylene blue, cobalt blue, victoria blue, methyl violet, aniline blue, ultramarine blue, sky blue, indanthrene blue and cerulean blue.

Green electrophoretic particles are, for example, phthalocyanine green, malachite green lake, naphthol green, emerald green, viridian, cobalt green and chrome oxide.

Purple electrophoretic particles are, for example, fast violet, methyl violet lake, indigo, mineral violet and cobalt violet.

Brown electrophoretic particles are, for example, toluidine maroon, indanthrene red violet RH, burnt umber and iron oxide.

One kind of these may be used alone, or two or more kinds may be used together.

It is also possible that white electrophoretic particles are colored by, for example, using various colorants such as the above-described pigments and dyes and used.

The magnetophoretic particles are not particularly limited and can be selected as appropriate according to the purpose as long as they are particles capable of magnetophoretically migrating in the dispersion medium in liquid form according to application of a magnetic field, and are, for example, ferromagnetic metal such as iron, nickel, and cobalt, ferromagnetic material such as an alloy containing the ferromagnetic metal, permanent magnet such as ferrite magnet and alloy magnet.

More specifically, black iron oxide, porous iron oxide, black magnetite, γ-hematite, manganese dioxide-containing iron oxide, chromium dioxide, ferrite, iron, nickel, cobalt, gadolinium and alloys of these can be used.

It is also possible that the surfaces of the magnetophoretic particles are colored by using various colorants and used.

In order to enhance dispersibility of the electrophoretic particles and magnetophoretic particles in the dispersion medium, prevent the electrophoretic particles and magnetophoretic particles from agglomerating, and stably migrate the electrophoretic particles and magnetophoretic particles, surface treatment is preferably applied to the surfaces of the electrophoretic particles and magnetophoretic particles.

For the surface treatment, a coupling agent is mainly used. The coupling agent is, for example, a chromium-based coupling agent, a silane-based coupling agent, a titanate-based coupling agent, an aluminum-based coupling agent, a zirconium-based coupling agent, a zircon-alumminate coupling agent and a fluorine-based coupling agent.

As the surface treatment, a method in which a graft chain is formed on the surfaces of the electrophoretic particles and magnetophoretic particles, and a method in which the surfaces of the electrophoretic particles and the magnetophoretic particles are coated with a polymer, are also effective.

A mean particle diameter of the electrophoretic particles and magnetophoretic particles is not particularly limited and can be selected as appropriate according to the purpose, however, it is preferably 0.01 µm to 20 µm, more preferably 0.03 µm to 5 µm, and particularly preferably 0.1 µm to 1 µm. If the mean particle diameter is larger than 20 µm, the particle responsiveness may lower and the resolution may deteriorate, and if the mean particle diameter is smaller than 0.01 µm, particles may agglomerate and the image density may deteriorate.

The mean particle diameter means a particle diameter of an average primary particle representing the particle group, and is represented as a number mean diameter. In detail, particles are directly taken out, or the rewritable recording medium is cut and the section thereof is directly observed with an electron microscope, and primary particle diameters of the particles are obtained, and a mean value of these (for example, a mean value of 100 particles) is obtained.

In view of image quality and recording speed, electrophoretic particles are preferably used.

As the electrophoretic particles and magnetophoretic particles, only one kind may be used, or two or more kinds may be used.

When one kind of the electrophoretic particles and magnetophoretic particles is used, by coloring the dispersion medium by dissolving a dye of a color different from the color of the electrophoretic particles and magnetophoretic particles into the dispersion medium, recording of image information is enabled. On the other hand, when two kinds of the electrophoretic particles and magnetophoretic particles are used, by using particles with different colors and polarities, recording of image information is enabled, and the dispersion medium to be used in this case is normally transparent.

Use of both electrophoretic particles and magnetophoretic particles together is advantageous because the rewritable recording medium can be adapted to multicolor by selectively using three application methods, that is, application of only an electric field, application of only a magnetic field, and application of both an electric field and a magnetic field.

Contents of the electrophoretic particles and magnetophoretic particles in the image recording layer are not particularly limited and can be selected as appropriate according to the purpose.

—Dispersion Medium—

The dispersion medium is not particularly limited and can be selected as appropriate according to the purpose as long as it is a dispersion medium capable of dispersing at least one of the electrophoretic particles and magnetophoretic particles, and is, for example, an organic solvent, silicone oil and water. Among these, an organic solvent and silicone oil are preferable in view of migration, responsiveness, and image retainability of the electrophoretic particles and magnetophoretic particles.

The organic solvent is, for example, an alcohol solvent such as methanol, ethanol, and isopropyl alcohol, chain or cyclic aliphatic hydrocarbon such as pentane, hexane, heptane, octane, nonane, decane, dodecane, isohexane, isooctane, isododecane, tetradecane, dodecylbenzene, cyclohexane, kerosine, ISOPAR (registered trademark), naphthene, liquid paraffin, and petroleums, aromatic hydrocarbon such as benzene, toluene, xylene, alkylbenzene, solvent naphtha, phenylxylyl ethane, and diisopropylnaphthalene, halogenated hydrocarbon such as carbon tetrachloride, chloroform, dichloromethane, ethyl bromide, trichloroethylene, tetrachloroethylene, trifluoroethylene, tetrafluoroethylene, trichlorotrifluoroethylene, and tetrachlorodifluoroethylene.

Among these, a nonpolar solvent is preferable, and aliphatic hydrocarbon is more preferable.

As the silicone oil, for example, dialkyl silicone oil such as dimethyl silicone oil, and various modified silicone oils such as cyclic dialkyl silicone oil, alkyl phenyl silicone oil, cyclic alkyl phenyl silicone oil, and alkyl aralkyl silicone oil are preferably used.

The alkyl phenyl silicone oil is, for example, methyl phenyl silicone oil, ethyl phenyl silicone oil, propyl phenyl silicone oil, butyl phenyl silicone oil, hexyl phenyl silicone oil, octyl phenyl silicone oil, lauryl phenyl silicone oil and stearyl phenyl silicone oil.

The cyclic alkyl phenyl silicone oil is, for example, cyclic polymethyl phenyl siloxane, cyclic polyethyl phenyl siloxane, cyclic polybutyl phenyl siloxane, cyclic polyhexyl phenyl siloxane, cyclic polymethyl chlorophenyl siloxane and cyclic polymethyl bromophenyl siloxane.

The polyalkyl aralkyl silicone oil is, for example, benzyl modified silicone oil and methyl styryl modified silicone oil. The silicone oil to be used may be a commercially available product.

The silicone oil available on the market is, for example, KF96 series, KF50 series, KF54, and KF56 made by Shin-Etsu Chemical Co., Ltd., AK series, AS series, AR series, AP series, and PDM series made by Wacker Asahikasei Silicone Co., Ltd., TSF451 series, TSF456 series, TSF405, TSF4427, TSF431, TSF433, TSF437, and TSF456 series made by GE Toshiba Silicone Co., Ltd., SH200 series, and SH510, SH550, SH556, SH702, SH704, and SH705 made by Dow Corning Toray Silicone Co., Ltd.

Among these dispersion media, one kind may be used alone, or two or more kinds may be used together.

The dispersion medium may be colored by dissolving a dye of the same color as or a color different from the color of the electrophoretic particles and the magnetophoretic particles into the dispersion medium.

The dye is preferably an oil-soluble dye. The oil-soluble dye is not particularly limited and can be selected as appropriate according to the purpose, and is, for example, spirit black (SB, SSBB, AB), nigrosine base (SA, SAP, SAPL, EE, EEL, EX, EXBP, EB), oil yellow (105, 107, 129, 3G, GGS), oil orange (201, PS, PR), fast orange, oil red (5B, RR, OG), oil scarlet, oil pink 312, oil violet #730, Macrolex blue RR, Sumiplast green G, oil brown (GR, 416), Sudan black X60, oil green (502, BG), oil blue (613, 2N, BOS), oil black (HBB, 860, BS), Valifast yellow (1101, 1105, 3108, 4120), Valifast orange (3209, 3210), Valifast red (1306, 1355, 2303, 3304, 3306, 3320), Valifast pink 2310N, Valifast brown (2402, 3405), Valifast blue (3405, 1501, 1603, 1605, 1607, 2606, 2610), Valifast violet (1701, 1702), and Valifast black (1802, 1807, 3804, 3810, 3820, 3830).

The content of the dispersion medium in the image recording layer is not particularly limited and can be selected as appropriate according to the purpose.

—Thermoreversible Gelling Agent—

The thermoreversible gelling agent is not particularly limited and can be selected as appropriate according to the kind and amount of the dispersion medium as long as it is a thermoreversible gelling agent capable of converting the dispersion medium into a gel at the time of image browsing and image saving, and converting the dispersion medium into a liquid at the time of image recording at a temperature higher than the temperature for the image browsing and image saving. Further, as the thermoreversible gelling agent, a thermoreversible gelling agent having higher temperature responsiveness is preferable, and a thermoreversible gelling agent that converts the dispersion medium into a sol at once when the temperature becomes higher than a certain temperature, and converts the dispersion medium into a gel at once when the temperature becomes the certain temperature or lower, is more suitable.

Here, image browsing means a state where a person views image information recorded on the rewritable recording medium, and image saving means a state where image information is saved on the rewritable recording medium. In other words, the time of image browsing and image saving means a situation at a normal temperature, and for example, a state at a temperature of 10° C. or higher and lower than 40° C.

In the present invention, a gel means a state where the dispersion medium lost fluidity, and a state where electrophoretic particles and magnetophoretic particles dispersed in the dispersion medium are accordingly restrained from moving and are fixed. In the present invention, for providing the recording medium with flexibility, a gel is preferably a state with elasticity. On the other hand, a liquid is a state with fluidity of the dispersion medium, and a state where electrophoretic particles and magnetophoretic particles dispersed in the dispersion medium are accordingly enabled to freely move. In the present invention, a liquid preferably has sufficiently low viscosity so as not to restrain the electrophoretic particles and magnetophoretic particles from moving.

The thermoreversible gelling agent forms a three-dimensional network structure by hydrogen bonding, the van der Waals' force, hydrophobic interaction, electrostatic interaction, and π-π interaction. By incorporating the dispersion medium into the three-dimensional network structure, the dispersion medium is converted into a gel. On the other hand, the three-dimensional network structure is easily cut by heating, so that it is considered that the dispersion medium is returned to a liquid by heating. The three-dimensional network structure is formed in such a manner that, for example, the thermoreversible gelling agent molecules self-aggregate due to hydrogen bonding to form fibrous aggregates by intermolecular interaction, and further, the fibrous aggregates grow due to the van der Waals' force and hydrophobic or electrostatic interaction, and fibrous aggregates intertwine with each other. By incorporating the dispersion medium molecules into the three-dimensional network structure, gelatinization of the dispersion medium progresses.

The thermoreversible gelling agent is, for example, organogel and hydrogel.

The organogel is a thermoreversible gelling agent that can convert an organic solvent and silicone oil as the dispersion medium into a gel. Therefore, when an organic solvent or silicone oil is used as the dispersion medium, the organogel is suitably used as the thermoreversible gelling agent.

The organogel is, for example, 1,2,3,4-dibenzylidene-D-sorbitol, 12-hydroxystearic acid, N-lauroyl-L-glutamate-α,γ-bis-n-butylamide, spin-labeled steroid, cholesterol derivative, aluminum dialkylphosphate, phenol-based cyclic oligomer, 2,3-bis-n-hexadecyloxy anthracene, cyclic depsipeptide, partially fluorinated alkane, cystine derivative, bis(2-ethylhexyl)sodium sulfosuccinate, triphenylamine derivative, butyrolactone derivative, quaternary ammonium salt, fluorinated alkylated oligomer, urea derivative, vitamin H derivative, gluconamide derivative, cholic acid derivative, L-alanine derivative, L-isoleucine derivative, L-valine derivative, cyclic dipeptide derivative, oligo(α-amino acid), cyclohexane diamine derivative, 1,3,5-cyclohexane tricarboxylic acid derivative, double-headed amino acid derivative, and barbituric acid derivative/triaminopyridine derivative. Among these, one kind may be used alone, or two or more kinds may be used together.

A polymer type or oligomer type thermoreversible gelling agent is also known and useful.

Some of low-molecular thermoreversible gelling agents may turn into crystal depending on its structure if it is left for a long period of time, and have a problem in stability. On the other hand, a polymer type or oligomer type thermoreversible gelling agent does not crystallize due to molecular weight distribution and motion of flexible chain, so that it is effective. A polymer type or oligomer type thermoreversible gelling agent can be obtained by, for example, introducing a gelatinizing component that causes gelatinization into a polymer component that hinders crystallization.

In the rewritable recording medium, the thermoreversible gelling agent is used in the image recording layer, so that it is important that the temperature response of sol-gel transition of the dispersion medium is fast (the thermoreversible gelling agent quickly converts the dispersion medium into a liquid when it is heated, and instantaneously returns the dispersion medium to a gel when it is returned to a normal temperature), and it is important that even after this operation is repeated, the gelling agent stably functions without crystallization and collapse of the gel. Therefore, among the above-described thermoreversible gelling agents, the following gelling agent is particularly effectively used.

It is important that the thermoreversible gelling agent quickly forms aggregates by hydrogen bonding, and therefore, an amide bond (—NHCO—) (preferably, a plurality of amide bonds) is preferably contained in the structure of the thermoreversible gelling agent. The energy source for the thermoreversible gelling agent to convert the dispersion medium into a gel is formation of hydrogen bonding between N—H and C=O of the amide bond. Formation of a gel with high temperature responsiveness depends on reactivity of the hydrogen bonding, so that the thermoreversible gelling agent preferably has an amide bond in the molecule thereof.

The thermoreversible gelling agent preferably has a urethane bond (—NHCOO—) in the molecule thereof. The thermoreversible gelling agent having a urethane bond exerts an effect of further enhancing the temperature responsiveness of sol-gel transition of the dispersion medium as compared with the thermoreversible gelling agent having only an amide bond. This thermoreversible gelling agent containing a urethane bond reduces the difference between a gel-to-sol transition temperature and a sol-to-gel transition temperature of the dispersion medium, and exerts an effect of reducing hysteresis, so that it is very useful in the present invention.

Even if the thermoreversible gelling agent has only one each of the amide bond and the urethane bond, the thermoreversible gelling agent forms hydrogen bonding, however, in order to quickly form a gel, pluralities of amide bonds and urethane bonds are preferably contained in the structure of the thermoreversible gelling agent, and larger numbers of amide bonds and urethane bonds are preferable. Accordingly, the gelatinization capability of the dispersion medium is enhanced, and the temperature responsiveness of sol-gel transition of the dispersion medium becomes much higher, so that this is effective in the present invention.

The thermoreversible gelling agent further preferably has a siloxane bond in the molecule thereof. The siloxane bond is a structure in which silicon (Si) and oxygen (O) are alternately bonded. Examples of the structure of the thermoreversible gelling agent containing a siloxane bond are shown as follows.

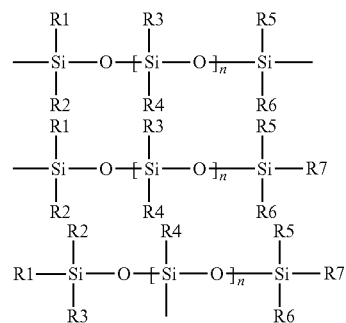

In the general formulas shown above, R1 to R7 are substituents.

The thermoreversible gelling agent having the siloxane bond hardly crystallize, and can enhance the stability of a gel. In addition, the gel tends to be softened, and this is effective for enhancing flexibility of the rewritable recording medium.

As the siloxane bond in the thermoreversible gelling agent becomes longer, the gel becomes softer, and the sol-gel transition temperatures of the dispersion medium tend to become lower. However, if the gel of the dispersion medium becomes excessively soft, the function of fixing the electrophoretic particles or the magnetophoretic particles may deteriorate and the safety may deteriorate. It is preferable that the length of the siloxane bond is properly controlled with respect to the sol-gel transition temperatures and flexibility of the dispersion medium set for the rewritable recording medium.

A preferable length of the siloxane bond in the thermoreversible gelling agent is defined as follows. That is, it is preferable that the number of silicon atoms A of the siloxane bond in the molecule of the thermoreversible gelling agent and the total number B of the amide bonds (—NHCO—) and urethane bonds (—NHCOO—) in the molecule satisfy the following equation (I):

$$0.5 \leq A/B < 3.0 \qquad \text{Equation (I)}$$

If A/B becomes smaller than this range (smaller than 0.5), the sol-gel transition temperatures of the dispersion medium may be excessively higher than sol-gel transition temperatures suitable for the rewritable recording medium, there is a possibility that the gel becomes unstable, or the gel becomes excessively hard and the flexibility becomes smaller. On the other hand, if A/B is larger than this range (3.0 or more), there is a possibility that the sol-to-gel transition temperature becomes excessively lower than a sol-to-gel transition temperature suitable for the rewritable recording medium, or the gel becomes excessively soft, and the dispersion medium does not turn into a gel even at a normal temperature and the image retainability deteriorates.

It is more preferable that the thermoreversible gelling agent contains at least one of an alkyl group with 8 or more carbon atoms and an alkylene group with 8 or more carbon atoms in the molecule. In order to grow aggregates formed by hydrogen bonding of the amide bond or urethane bond of the thermoreversible gelling agent into fibrous form and further form a three-dimensional network structure, a structure for causing aggregates to easily interact with each other is necessary. It is considered that these long-chain alkyl group and long-chain alkylene group promote intermolecular interaction and contribute to the formation of the fibrous aggregates and three-dimensional network structure.

The number of carbon atoms of the alkyl group is preferably 8 to 20. The number of carbon atoms of the alkylene group is preferably 8 to 12.

In the rewritable recording medium according to the present invention, as the thermoreversible gelling agent, any material can be used as long as it is a gelling agent that is thermoreversible, however, it is important to select a gelling agent which is applicable to a highly insulative dispersion medium, makes the sol-gel transition temperatures of the dispersion medium suitable for a usage environment of the recording medium, makes fast the temperature response of sol-gel transition of the dispersion medium (quickly converts the dispersion medium into a liquid when the gelling agent is heated, and instantaneously converts the dispersion medium into a gel when the gelling agent is returned to a normal temperature), and stably functions without crystallization of the thermoreversible gelling agent and collapse of a gel even after the dispersion medium repeats sol-gel transition.

Particularly preferable examples of the thermoreversible gelling agent to be used in the rewritable recording medium according to the present invention are shown below. These are just examples, and the thermoreversible gelling agent according to the present invention is not limited to these.

General formula (1)

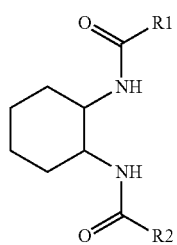

In the general formula (1), R1 and R2 are alkyl groups with 8 or more carbon atoms. R1 and R2 may be the same or different. The number of carbon atoms of the alkyl groups is preferably 8 to 20.

General formula (2)

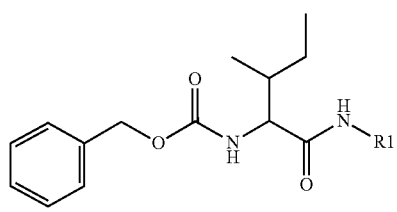

In the general formula (2), R1 is an alkyl group with 8 or more carbon atoms. The number of carbon atoms of the alkyl group is preferably 8 to 20.

General formula (3)

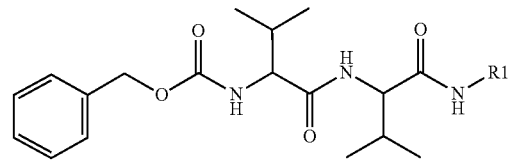

In the general formula (3), R1 is an alkyl group with 8 or more carbon atoms. The number of carbon atoms of the alkyl group is preferably 8 to 20.

General formula (4)

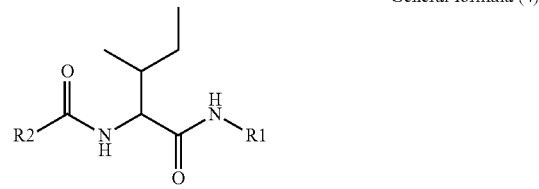

In the general formula (4), R1 and R2 are alkyl groups with 8 or more carbon atoms independently of each other. The number of carbon atoms of the alkyl groups is preferably 8 to 20.

General formula (5)

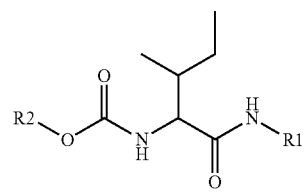

In the general formula (5), R1 and R2 are alkyl groups with 8 or more carbon atoms independently of each other. The number of carbon atoms of the alkyl groups is preferably 8 to 20.

General formula (6)

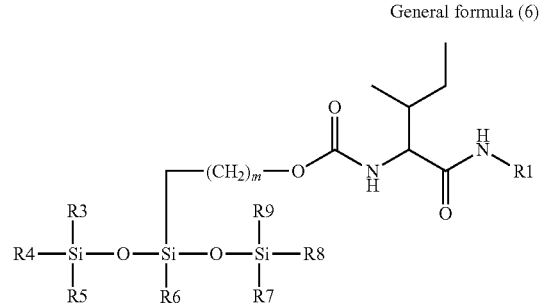

In the general formula (6), R1 is an alkyl group with 8 or more carbon atoms and 20 or less. R3 to R9 are any of a hydrogen atom, an alkyl group with 1 to 12 carbon atoms, an alkoxy group with 1 to 12 carbon atoms, and an aryl group that may have a substituent. R3 to R9 may be the same or different. m is an integer of 1 to 20.

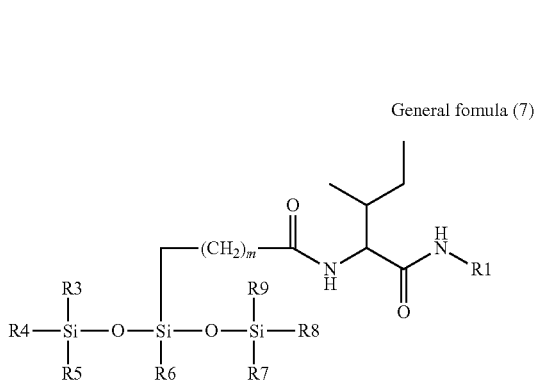

General formula (7)

In the general formula (7), R1 is an alkyl group with 8 or more carbon atoms and 20 or less. R3 to R9 are any of a hydrogen atom, an alkyl group with 1 to 12 carbon atoms, an alkoxy group with 1 to 12 carbon atoms, and an aryl group that may have a substituent. R3 to R9 may be the same or different. m is an integer of 1 to 20.

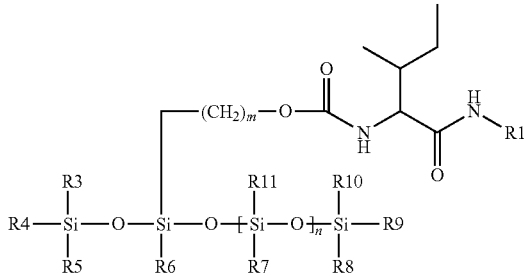

General formula (8)

In the general formula (8), R1 is an alkyl group with 8 or more carbon atoms and 20 or less. R3 to R11 are any of a hydrogen atom, an alkyl group with 1 to 12 carbon atoms, an alkoxy group with 1 to 12 carbon atoms, and an aryl group that may have a substituent. R3 to R11 may be the same or different. m is an integer of 1 to 20, and n is an integer of 1 to 80.

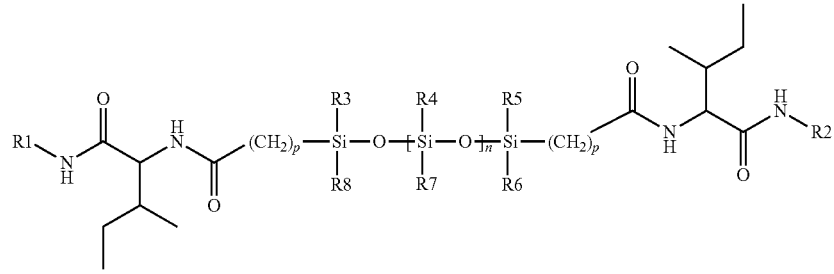

General formula (9)

In the general formula (9), R1 and R2 are alkyl groups with 8 to 20 carbon atoms. R3 to R8 are any of a hydrogen atom, an alkyl group with 1 to 12 carbon atoms, an alkoxy group with 1 to 12 carbon atoms, and an aryl group that may have a substituent. R3 to R8 may be the same or different. n is an integer of 0 to 80, and p is an integer of 1 to 20.

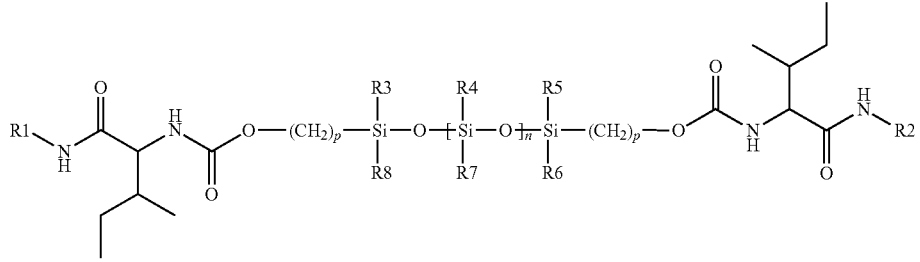

General formula (10)

In the general formula (10), R1 and R2 are alkyl groups with 8 to 20 carbon atoms. R3 to R8 are any of a hydrogen atom, an alkyl group with 1 to 12 carbon atoms, an alkoxy group with 1 to 12 carbon atoms, and an aryl group that may have a substituent. R3 to R8 may be the same or different. N is an integer of 0 to 80, and p is an integer of 1 to 20. The thermoreversible gelling agent can be synthesized by referring to descriptions of, for example, JP-A Nos. 2004-182697, 2004-262856, and 2005-232108.

The content of the thermoreversible gelling agent in the image recording layer is determined so that the dispersion medium turns into a gel at the time of image browsing and image saving (for example, at a normal temperature), and turns into a liquid at the time of image recording (writing) (for example, at a temperature higher than the temperature for image browsing and image saving), and preferably 0.05% to 50% by mass, more preferably 0.1% to 10% by mass, and particularly preferably 0.5% to 5% by mass with respect to the dispersion medium. If the content of the thermoreversible gelling agent is less than 0.05% by mass, gelatinization of the dispersion medium may become insufficient and the image retainability may deteriorate, and if the content is more than 50% by mass, even by heating, viscosity of the dispersion medium may not be sufficiently reduced and insoluble matters may remain and hinder movement of the electrophoretic particles and magnetophoretic particles, and cause deterioration of the image quality.

The sol-to-gel and gel-to-sol (liquefaction) transition temperatures of the dispersion medium in the image recording layer are not particularly limited and can be selected as appropriate according to the purpose, however, they are preferably 40° C. to 120° C., more preferably 50° C. to 100° C.

The sol-to-gel and gel-to-sol transition temperatures can be adjusted by properly selecting the kind and amount of the dispersion medium and the kind and amount of the thermoreversible gelling agent. If the sol-to-gel and gel-to-sol transition temperatures are lower than 40° C., they pose no problem in a normal environment, however, when the recording medium is used outdoors where it is exposed to direct sunlight or in a sun-heated car, the image retainability may deteriorate. In particular, unlike a PLD, it is assumed that the rewritable recording medium is used in various environments including outdoors, so that high image retainability is also required in these environments. For stable use in such environments, the sol-to-gel and gel-to-sol transition temperatures of the dispersion medium are more preferably 50° C. or higher. On the other hand, if the sol-to-gel and gel-to-sol transition temperatures become higher than 120° C., the time taken to reach the temperatures becomes longer, and may deteriorate the recording speed and image quality.

Here, the sol-to-gel and gel-to-sol transition temperatures are temperatures at which the dispersion medium turns from a sol (liquid) into a gel and from a gel into a sol (liquid) by the action of the thermoreversible gelling agent.

—Other Components—

The other components in the image recording layer are, for example, a dispersant and a surfactant. However, in the present invention, components contained in the image recording layer are not limited to these, and components other than these may also be contained.

—Dispersant—

The dispersant is not particularly limited and can be selected as appropriate according to the purpose as long as it is a dispersant capable of enhancing dispersibility of the electrophoretic particles and magnetophoretic particles in the dispersion medium, preventing the electrophoretic particles and magnetophoretic particles from agglomerating, and making the electrophoretic particles and magnetophoretic particles stably migrate.

As the dispersant, a dispersant that is soluble in the dispersion medium and has a function of restraining the electrophoretic particles and magnetophoretic particles from agglomerating by electrostatic repulsion or steric hindrance by adsorbing to the surfaces of the particles is preferable.

The dispersant is not particularly limited and can be selected as appropriate according to the purpose, however, it is preferably a dispersant soluble in a nonpolar solvent, and more preferably a polymer dispersant. This is because the dispersion stability of particles in a nonpolar organic solvent system greatly depends on the steric effect of a polymer compound.

The polymer dispersant is preferably a polymer dispersant having a basic group and a polymer dispersant having an acid group, and the former dispersant is more preferable. The reason for this is because it is considered that, when, for example, a pigment like carbon black is used as electrophoretic particles, a basic polymer dispersant adsorbs to the surface of the pigment and acts as a positive charge-controlling agent, and exerts an effect of positively charging the pigment surface.

The basic polymer dispersant is, for example, a polymer obtained from at least one kind of monomer having a basic group, such as N-methylaminoethyl(meth)acrylate, N-ethylaminoethyl(meth)acrylate, N,N-dimethylaminoethyl(meth)acrylate, N,N-diethylaminoethyl(meth)acrylate, N,N-dibutylaminoethyl acrylate, N,N-di-tert-butylaminoethyl acrylate, N-phenylaminoethyl methacrylate, N,N-diphenylaminoethyl methacrylate, aminostyrene, dimethylaminostyrene, N-methylaminoethylstyrene, dimethylaminoethoxystyrene, diphenylaminoethylstyrene, N-phenylaminoethylstyrene, 2-N-piperidylethyl(meth)acrylate, 2-vinylpyridine, 4-vinylpyridine and 2-vinyl-6-methylpyridine, and at least one kind of alkyl ester and aryl ester of (meth)acrylic acid.

As for the basic polymer dispersant, a commercially available product may be used. As the product available on the market, SOLSPERSE 17000 (single polyester, anchoring site: basic group), SOLSPERSE 16000 (single polyester, anchoring site: basic group), SOLSPERSE 41000 (single polyester, anchoring site: acid), and SOLSPERSE 3000 (single polyester, anchoring site: acid) made by Lubrizol Japan Limited can be preferably used. As another example, Disperbyk-2050, 2150, 160, 161, 162, 163, 164, 166, 167, and 182 (all of these are made by BYK Japan KK) can also be preferably used.

—Surfactant—

The surfactant is added for the purpose of improving of the dispersion stability of the electrophoretic particles and magnetophoretic particles, obtaining a sufficient migration speed, and enhancing image retainability.

The surfactant is not particularly limited and can be selected as appropriate according to the purpose, however, it is preferably a nonionic based surfactant. If a surfactant other than nonionic based surfactants is used, for example, an ionic surfactant is used, the ionic surfactant adsorbs to the surfaces of the electrophoretic particles and magnetophoretic particles and the behavior of the electrophoretic particles and magnetophoretic particles may become unstable.

The nonionic based surfactant is, for example, polyoxyethylene alkylether, polyoxyethylene alkylarylether, polyoxyethylene alkylphenylether, polyoxyethylene glycolester, polyoxyethylene fatty acid amide, polyoxyethylene fatty acid ester, polyoxyethylene polyoxypropylene glycol, glycerin ester, sorbitan ester, sucrose esters, polyoxyethylene ether of glycerin ester, polyoxyethylene ether of sorbitan ester, polyoxyethylene ether of sorbitol ester, fatty acid alkanolamide, amine oxide, polyoxyethylene alkylamine, glycerin fatty acid ester, sorbitan fatty acid ester, polyoxyethylene sorbitan fatty acid ester, polyoxyethylene sorbitol fatty acid ester and alkyl (poly)glycoside.

The nonionic based surfactant is preferably sorbitan trioleate, sorbitan laurate, sorbitan palmitate, sorbitan stearate, sorbitan tristearate, sorbitan oleate, sorbitan tribehenate, and sorbitan caprylate.

The thickness of the image recording layer is not particularly limited and can be selected as appropriate according to the purpose, however, it is preferably 5 µm to 200 µm, more preferably 10 µm to 100 µm, and particularly preferably 20 µm to 60 µm. If the thickness of the image recording layer is less than 5 µm, the contrast ratio may lower, and if the thickness is more than 200 µm, the recording speed and resolution may deteriorate. The thickness of the image recording layer is the thickness of the thickest portion of the image recording layer. For example, as described in FIG. 6 and FIG. 7, when the cross-section of the image recording layer is a cross-section in which a plurality of substantially circular shapes, a plurality of substantially oval shapes, or a plurality of both the substantially circular shapes and the substantially oval shapes are arranged, the length longest in the thickness direction is the thickness of the image recording layer.

<Spacer>

The spacer is not particularly limited and can be selected as appropriate according to the purpose.

The spacer prevents the electrophoretic particles and magnetophoretic particles from being biased. In addition, the spacer keeps the thickness of the image recording layer constant.

The spacer is preferably contained in the image recording layer.

As the base material, when the first base material and the second base material are used, the spacer is sandwiched by the first base material and the second base material.

When it is difficult to hold the thickness of the image recording layer against an external force of bending or pressurization only by the elasticity of the dispersion medium in a gel form, the presence of the spacer makes it possible to prevent excessive deformation with respect to the external force and retain image quality and stability.

The material of the spacer is not particularly limited and can be selected as appropriate according to the purpose, and is plastic, metal oxide, glass or ceramic. Among these, plastic is preferable because it is lightweight and has high transparency and excellent workability.

The plastic material is, for example, polystyrene resin, polyester resin, or acryl resin.

The material of the metal oxide is, for example, silica or alumina.

Figure 3:
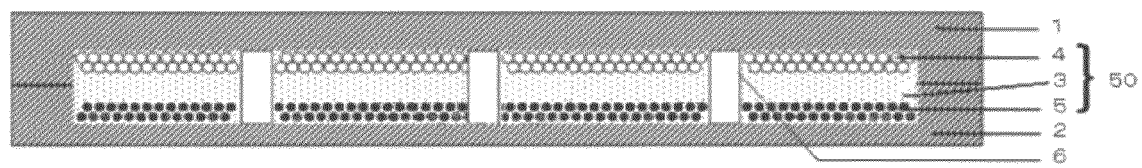
FIG. 3 is a schematic view showing another example of the rewritable recording medium according to the present invention.
Figure 4:
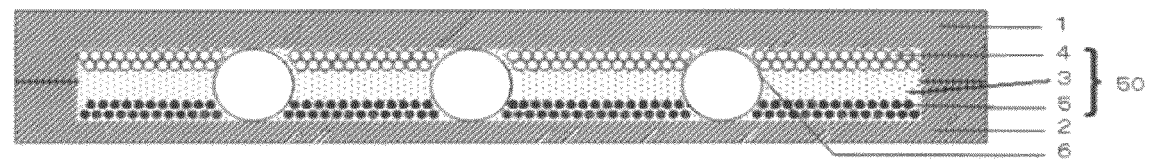
FIG. 4 is a schematic view showing another example of the rewritable recording medium according to the present invention.

The shape of the spacer is not particularly limited and can be selected as appropriate according to the purpose, and for example, as viewed in a section shape, the spacer is particles having the shapes of rectangles as shown in FIG. 3, or true circles or substantially circular shapes as shown in FIG. 4. Among these, the true circles or substantially circular shapes are preferable because the spacer can be easily disposed and the rewritable recording medium can be manufactured at a low cost.

The spacer is, for example, resin particles, metal oxide particles or glass beads. When the spacer is spherical, the particle diameter thereof is not particularly limited and can be selected as appropriate according to the purpose, however, it is preferably the same as the thickness of the image recording layer. In detail, the particle diameter is preferably 5 µm to 200 µm, more preferably 10 µm to 100, and particularly preferably 20 µm to 60 µm. In this case, to uniformize the thickness of the image recording layer, the particle diameter distribution of these spacers is preferably sharp (narrow). As these spacers, spacers used for liquid crystal can be effectively used.

The spacer may be hollow inside. As a spacer hollow inside, hollow fine particles are effectively used.

Figure 5:
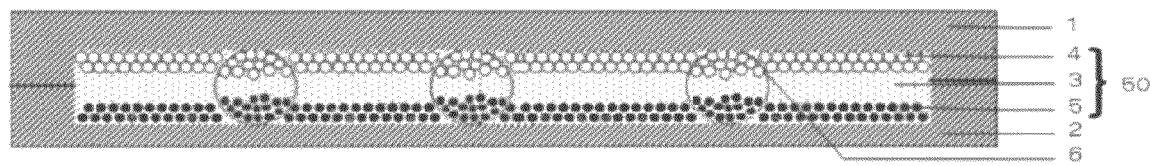
FIG. 5 is a schematic view showing another example of the rewritable recording medium according to the present invention.

When the spacer is hollow inside, as shown in FIG. 5, the same material as the material forming the image recording layer is preferably filled into the hollow insides. When the spacer is provided, normally, portions on which no image is recorded increases and the image quality may deteriorate. However, by filling the inside of the spacer with the same material as the material forming the image recording layer, the problem of image quality deterioration is solved. Such a spacer can be easily fabricated by using microcapsules in which the material forming the image recording layer is encapsulated as the spacer, and this is useful.

A mean thickness of the rewritable recording medium is not particularly limited and can be selected as appropriate according to the purpose, however, it is preferably 15 µm to 1,200 µm, more preferably 30 µm to 600 µm, and particularly preferably 50 µm to 260 µm.

A production method for the rewritable recording medium is not particularly limited and can be selected as appropriate according to the purpose, however, the following production method for the rewritable recording medium according to the present invention is preferable.

(Production Method for Rewritable Recording Medium)

<First Production Method>

A production method (first production method) for the rewritable recording medium according to the present invention includes at least an image recording layer forming step and a second base material forming step, and further includes other steps as appropriate.

—Image Recording Layer Forming Step—

The image recording layer forming step is not particularly limited and can be selected as appropriate according to the purpose as long as it is a step of applying an image recording layer forming material to a first base material, where the dispersion medium is in a liquid form, to thereby form an image recording layer.

—Image Recording Layer Forming Material—

The image recording layer forming material contains at least one of electrophoretic particles and magnetophoretic particles, and at least a dispersion medium, and a thermoreversible gelling agent, and further contains other components as appropriate.

The electrophoretic particles and magnetophoretic particles are the same as the electrophoretic particles and magnetophoretic particles in the rewritable recording medium according to the present invention.

The dispersion medium is the same as the dispersion medium in the rewritable recording medium according to the present invention.

The thermoreversible gelling agent is the same as the thermoreversible gelling agent in the rewritable recording medium according to the present invention.

—Application—

The applying method is not particularly limited and can be selected as appropriate according to the purpose, and is, for example, blade coating, bar coater coating, spray coating, dipping coating, roll coating or air knife coating.

The first base material is not particularly limited and can be selected as appropriate, and is made of, for example, the same material as that of the base material in the rewritable recording medium according to the present invention.

As provision of the image recording layer forming material, for example, the image recording layer forming material is heated to a temperature equal to or higher than a gel-to-sol (liquefaction) transition temperature to convert the dispersion medium into a liquid, and then applied onto the first base material by the above-described method, whereby forming the image recording layer.

The dispersion medium of the image recording layer formed on the first base material through the image recording layer forming step can be cooled and converted into a gel, and can also be kept a liquid by being heated together with the base material.

—Second Base Material Forming Step—

The second base material forming step is not particularly limited and can be selected as appropriate according to the purpose as long as it is a step of forming a second base material on the image recording layer formed on the first base material.

The second base material to be formed is not particularly limited and can be selected as appropriate according to the purpose, and is made of, for example, the same material as that of the base material in the rewritable recording medium according to the present invention.

The method for forming the second base material is not particularly limited and can be selected as appropriate according to the purpose, and is, for example, a method in which an application liquid in which the material for forming the second base material is dissolved is applied onto the image recording layer, a method in which the second base material is stuck on the image recording layer.

The applying method is not particularly limited and can be selected as appropriate according to the purpose, and is, for example, blade coating, bar coater coating, spray coating, dipping coating, roll coating, or air knife coating.

The sticking method is not particularly limited and can be selected as appropriate according to the purpose, and is, for example, a sticking method using a laminator, a sticking method by sandwiching between a pair of rollers.

—Other Steps—

The other steps are a joining step of joining the first base material and the second base material together.

The joining step is not particularly limited and can be selected as appropriate according to the purpose as long as it is a step of joining the first base material and the second base material together. Portions to be joined together are preferably peripheral edge portions of the first base material and the second base material.

The joining method is not particularly limited and can be selected as appropriate according to the purpose, and the first base material and the second base material are directly joined together, or the first base material and the second base material are joined by sandwiching another member, for example, a member made of the same material as that of these base materials therebetween. For example, the joining method is a method in which the base materials are joined together by providing a spacer film capable of sticking the first base material and the second base material on both surfaces on the peripheral edge portion of the rewritable recording medium, or a method in which a joining member is provided to cover the peripheral edge portions of the first base material and the second base material.

<Second Production Method>

The production method (second production method) for the rewritable recording medium according to the present invention includes at least a gel particle forming step and an image recording layer and second base material forming step, and further includes other steps as appropriate.

—Gel Particle Forming Step—

The gel particle forming step is not particularly limited and can be selected as appropriate according to the purpose as long as it is a step of mixing a dispersion liquid containing: electrophoretic particles, magnetophoretic particles, or both of the electrophoretic particles and the magnetophoretic particles; a dispersion medium; and a thermoreversible gelling agent, with a liquid that is immiscible with the dispersion medium, to thereby form gel particles of the dispersion liquid.

The mixing method is not particularly limited and can be selected as appropriate according to the purpose, and is, for example, a method in which a dispersion liquid containing a thermoreversible gelling agent is poured in a liquid immiscible with the dispersion medium, followed by stirring as appropriate.

The electrophoretic particles and magnetophoretic particles are the same as the electrophoretic particles and magnetophoretic particles in the rewritable recording medium according to the present invention.

The dispersion medium is the same as the dispersion medium in the rewritable recording medium according to the present invention.

The thermoreversible gelling agent is the same as the thermoreversible gelling agent in the rewritable recording medium according to the present invention.

The liquid immiscible with the dispersion medium is not particularly limited and can be selected as appropriate according to the purpose as long as it is a solvent immiscible with the dispersion medium, and is, for example, water.

The fabricating method for the gel particles is not particularly limited and can be selected as appropriate according to the purpose, and is, for example, a method in which while the liquid that is immiscible with the dispersion medium and adjusted to a temperature that causes the dispersion medium in the dispersion liquid to turn into a gel is stirred, the dispersion liquid is mixed (for example, dripped or sprayed) therein, and the dispersion medium is converted into a gel while the dispersion liquid is formed into particulate shapes by a shearing force of stirring, whereby fabricating the gel particles. In addition, a method is also possible in which while the liquid that is immiscible with the dispersion medium and adjusted to a temperature that causes the dispersion medium in the dispersion liquid to turn into a liquid is stirred, the dispersion liquid is mixed (for example, dripped or sprayed) therein, and while the dispersion liquid is formed into particulate shapes by a shearing force of stirring, the temperature of the system is cooled to a temperature that causes the dispersion medium to turn into a gel to convert the dispersion medium into a gel, whereby fabricating the gel particles.

—Image Recording Layer and Second Base Material Forming Step—

The image recording layer and second base material forming step is not particularly limited and can be selected as appropriate according to the purpose as long as it is a step of applying the gel particles to a first base material to form an image recording layer and forming a second base material on the formed image recording layer.

The first base material is not particularly limited and can be selected as appropriate according to the purpose, and is made of, for example, the same material as that of the base material in the rewritable recording medium according to the present invention.

The shape of the image recording layer to be formed by the image recording layer forming step is not particularly limited and can be selected as appropriate according to the purpose, however, it is preferable that the cross-section of the image recording layer is a collective shape formed by aligning a plurality of substantially circular shapes and/or substantially oval shapes for easy formation, preventing excessive deformation with respect to an external force, preventing electrophoretic particles and magnetophoretic particles from being excessively biased, and retaining image quality and stability without requiring a spacer.

The providing method is not particularly limited and can be selected as appropriate, and is, for example, blade coating, bar coater coating, spray coating, dipping coating, roll coating or air knife coating.

The image recording layer and second base material forming step is, for example, a step (first step) in which the image recording layer is formed by providing the gel particles onto the first base material, and subsequently, the second base material is formed on the formed image recording layer, and a step (second step) in which by providing the gel particles onto the first base material, the image recording layer is formed and the second base material is formed.

The second base material to be formed is not particularly limited and can be selected as appropriate according to the purpose, and is made of, for example, the same material as that of the base material in the rewritable recording medium according to the present invention.

—First Step—

The first step is, for example, a step in which after the image recording layer is formed by applying a liquid containing the gel particles onto the first base material, an application liquid in which the material for forming the second base material is dissolved is applied onto the formed image recording layer to form the second base material.

The application method is not particularly limited and can be selected as appropriate according to the purpose, and is, for example, blade coating, bar coater coating, spray coating, dipping coating, roll coating or air knife coating.

—Second Step—

The second step is, for example, a step in which a liquid obtained by dissolving or dispersing a material for forming the second base material in a liquid that contains the gel particles, a liquid immiscible with the dispersion medium, and the material for forming the second base material, and is immiscible with the dispersion medium is provided onto the first base material to form the image recording layer and the second base material.

In this method, as the material for forming the second base material, a material that is soluble or dispersible in a liquid immiscible with the dispersion medium is used. When the liquid immiscible with the dispersion medium is water, the material is, for example, a water-soluble polymer such as polyvinyl alcohol and emulsion of synthetic resin. When a photo-curable resin is used as the material, the second base material can be formed by curing the material by light, so that when forming the second base material, it is not necessary to use heat more than necessary, and the image recording layer can be formed by retaining the shapes of the gel particles.

—Other Steps—

The other steps are, for example, a joining step of joining the first base material and the second base material together.

The joining step is not particularly limited and can be selected as appropriate according to the purpose as long as it is a step of joining the first base material and the second base material together. The portions to be joined are preferably the peripheral edge portions of the first base material and the second base material.

The joining method is not particularly limited and can be selected as appropriate according to the purpose, and the first base material and the second base material are directly joined together, or a member made of the same material as that of these base materials is sandwiched by the base materials and the base materials are joined. For example, a method in which a spacer film capable of sticking the first base material and the second base material on both surfaces is provided on the peripheral edge portion of the rewritable recording medium and joins the base materials together, and a method in which a joining member is provided to cover the peripheral edge portions of the first base material and the second base material, can be used.

An example of the rewritable recording medium according to the present invention and an example of the production method for the rewritable recording medium according to the present invention are described with reference to the drawings.

The rewritable recording medium shown in FIG. 1 includes a first base material 1, a second base material 2, and an image recording layer 50 sandwiched by the first base material 1 and the second base material 2 (that is, enclosed by the base material). The image recording layer 50 contains white electrophoretic particles 4, black electrophoretic particles 5, and a dispersion medium 3 containing a thermoreversible gelling agent. The first base material 1 and the second base material 2 are transparent.

The rewritable recording medium shown in FIG. 1 can be manufactured by coating an image recording layer forming material containing the white electrophoretic particles 4, the black electrophoretic particles 5, the thermoreversible gelling agent, and the dispersion medium 3 so as to have a predetermined mean thickness on the first base material 1 while the dispersion medium 3 is a liquid, and while the temperature is kept, sticking the second base material 2 thereon, and bonding end portions of the first base material 1 and the second base material 2.

The rewritable recording medium shown in FIG. 1 can be manufactured by coating an image recording layer forming material containing the white electrophoretic particles 4, the black electrophoretic particles 5, the thermoreversible gelling agent, and the dispersion medium 3 so as to have a predetermined mean thickness on the first base material 1 while the dispersion medium 3 is a liquid, cooling it to a room temperature to convert the dispersion medium into a gel, and then laminating the second base material 2 by coating a solution of the material for forming the second base material 2 thereon.

Figure 2:
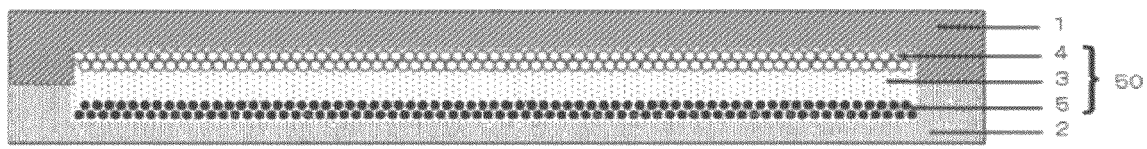
FIG. 2 is a schematic view showing another example of the rewritable recording medium according to the present invention.

The rewritable recording medium shown in FIG. 2 has a structure almost the same as that of the rewritable recording medium shown in FIG. 1, however, the first base material 1 that becomes the surface opposite to the surface on the side to be viewed is opaque. Accordingly, a high contrast ratio is obtained, and the visibility can be enhanced.

The rewritable recording medium shown in FIG. 3 includes a first base material 1, a second base material 2, an image recording layer 50 sandwiched by the first base material 1 and the second base material 2 (that is, enclosed by the base material), and spacers 6 sandwiched by the first base material 1 and the second base material 2. The image recording layer 50 contains white electrophoretic particles 4, black electrophoretic particles 5, and a dispersion medium 3 containing a thermoreversible gelling agent. The spacers 6 have rectangular shapes in a sectional view.

The rewritable recording medium shown in FIG. 4 includes a first base material 1, a second base material 2, an image recording layer 50 sandwiched by the first base material 1 and the second base material 2 (that is, enclosed by the base material), and spacers 6 sandwiched by the first base material 1 and the second base material 2. The image recording layer 50 contains white electrophoretic particles 4, black electrophoretic particles 5, and a dispersion medium 3 containing a thermoreversible gelling agent. The spacers 6 have true circular shapes or substantially circular shapes in a sectional view.

The rewritable recording medium shown in FIG. 4 can be manufactured by coating an application liquid containing an image recording layer forming material containing the white electrophoretic particles 4, the black electrophoretic particles 5, the thermoreversible gelling agent, and the dispersion medium 3 and spacers 6 so as to have a predetermined mean thickness on the first base material 1 while the dispersion medium 3 is a liquid, cooling it to a room temperature to convert the dispersion medium into a gel, and then laminating the second base material 2 by coating a solution of the material for forming the second base material 2 thereon.

The rewritable recording medium shown in FIG. 5 includes a first base material 1, a second base material 2, an image recording layer 50 sandwiched by the first base material 1 and the second base material 2 (that is, enclosed by the base material), and spacers 6 sandwiched by the first base material 1 and the second base material 2. The image recording layer 50 contains white electrophoretic particles 4, black electrophoretic particles 5, and a dispersion medium 3 containing a thermoreversible gelling agent. The spacers 6 have substantially spherical shapes, and have hollows inside, and the insides are filled with the same materials as those forming the image recording layer 6.

Figure 6:
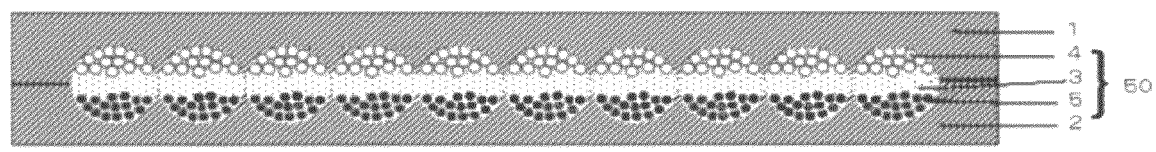
FIG. 6 is a schematic view showing another example of the rewritable recording medium according to the present invention.

The rewritable recording medium shown in FIG. 6 includes a first base material 1, a second base material 2, and an image recording layer 50 sandwiched by the first base material 1 and the second base material 2 (that is, enclosed by the base material). The image recording layer 50 contains white electrophoretic particles 4, black electrophoretic particles 5, and a dispersion medium 3 containing a thermoreversible gelling agent. The cross-section of the image recording layer 50 is a collective shape formed by aligning a plurality of substantially circular shapes. Specifically, the image recording layer 50 is formed of an aggregation of substantially spherical gel particles in a state aligned in close contact with each other on a plane.

Figure 9A:
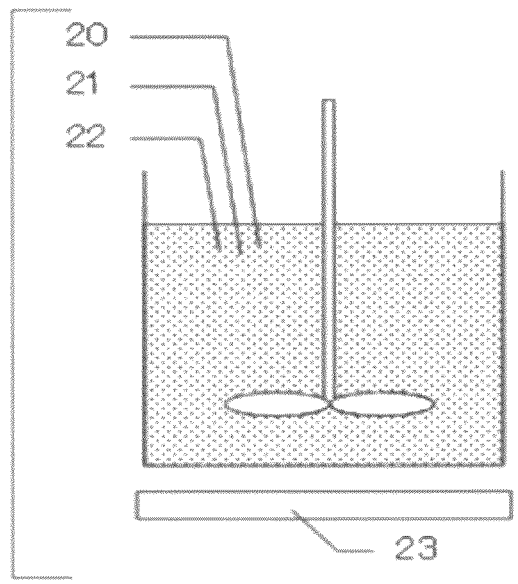
FIG. 9A is a schematic view for describing the example of the production method for a rewritable recording medium according to the present invention.
Figure 9B:
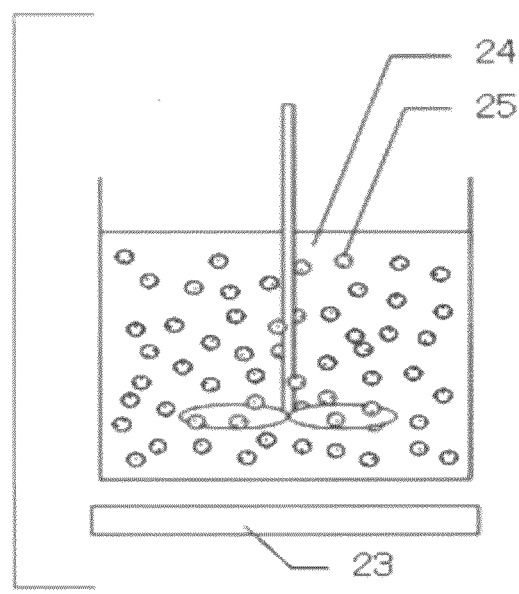
FIG. 9B is a schematic view for describing the example of the production method for a rewritable recording medium according to the present invention.
Figure 9C:
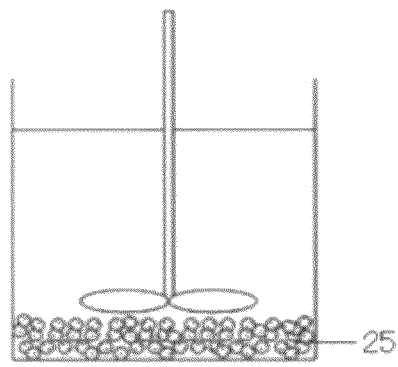
FIG. 9C is a schematic view for describing the example of the production method for a rewritable recording medium according to the present invention.

An example of manufacturing of the rewritable recording medium shown in FIG. 6 is described with reference to FIG. 9A to FIG. 9C. First, the electrophoretic particles 20, the thermoreversible gelling agent 21, and the dispersion medium 22 are put in a container with a heating unit 23 and mixed to fabricate a liquid containing these while the dispersion medium 22 is a liquid (FIG. 9A). This liquid is poured into a container equipped with the heating unit 23 and containing water 24, and stirred to obtain particles 25 with fluidity in which the liquid becomes particulate (FIG. 9B). By cooling the particles 25 together with the water 24, the dispersion medium contained in the particles 25 turns into a gel by the action of the thermoreversible gelling agent, whereby obtaining substantially spherical gel particles (FIG. 9C). By providing the substantially spherical gel particles onto the first base material, the image recording layer 50 having a collective shape including a large number of substantially spherical particles in a state aligned in close contact with each other on a plane is formed. Thereafter, by applying a water-soluble polymer such as polyvinyl alcohol dissolved in water onto the image recording layer 50, the second base material is formed, whereby obtaining the rewritable recording medium shown in FIG. 6.

Figure 7:
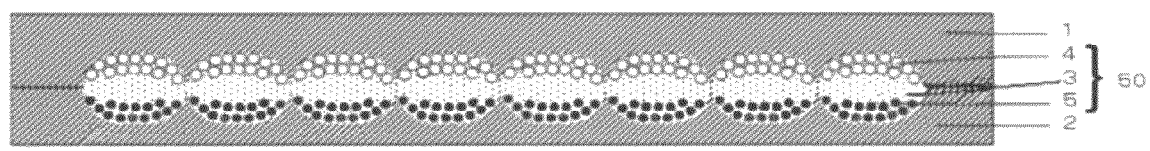
FIG. 7 is a schematic view showing another example of the rewritable recording medium according to the present invention.

The rewritable recording medium shown in FIG. 7 includes a first base material 1, a second base material 2, and an image recording layer 50 sandwiched by the first base material 1 and the second base material 2. The image recording layer 50 contains white electrophoretic particles 4, black electrophoretic particles 5, and a dispersion medium 3 containing a thermoreversible gelling agent. The cross-section of the image recording layer 50 is a collective shape formed by aligning a plurality of substantially oval shapes. Specifically, the image recording layer 50 is formed of an aggregation of substantially oval spherical gel particles in a state aligned in close contact with each other on a plane.

Manufacturing of the rewritable recording medium according to the present invention is easy, so that it can be manufactured suitably by roll-to-roll processing with excellent productivity. An example thereof is described with reference to FIG. 8.

Figure 8:
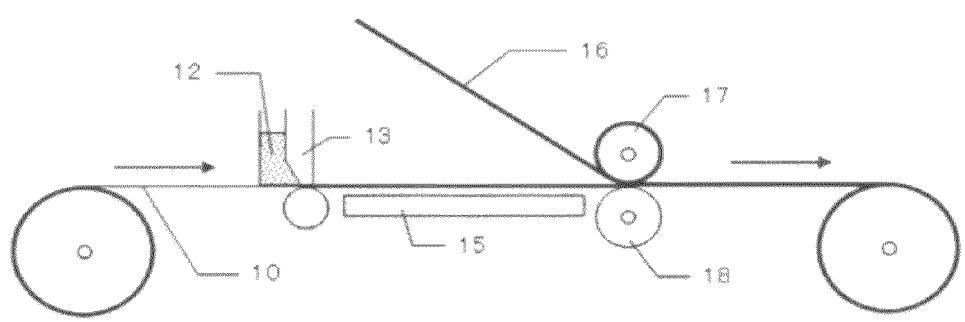
FIG. 8 is a schematic view showing an example of a production method for a rewritable recording medium according to the present invention.

In FIG. 8, in a state where the liquid 12 containing the electrophoretic particles, the thermoreversible gelling agent, and the dispersion medium (liquid) is heated to a temperature equal to or higher than the gel-to-sol transition temperature of the dispersion medium, the liquid 12 is coated on the first base material 10 by using a coater 13, and in a state where the temperature is kept by the heating unit 15, the first base material 10 on which the liquid 12 is applied and the second base material 16 are stuck together between a roller 17 and a roller 18 so that the liquid 12 is sandwiched by the first base material 10 and the second base material 16 to prevent air bubbles therein, whereby manufacturing the rewritable recording medium.

In the production method for the rewritable recording medium according to the present invention, the thermoreversible gelling agent is contained in the dispersion medium, so that the image recording layer can be formed into a desired shape, and it can be very easily manufactured by various methods. Therefore, the conventional step of enclosing the dispersion liquid inside a cell of a substrate and encapsulating the dispersion liquid in microcapsules becomes unnecessary, and the rewritable recording medium can be manufactured at a very low cost. At the same time, there are no barriers such as microcapsules between the base material and the electrophoretic particles and magnetophoretic particles, so that a high reflectance is obtained, and a high-quality image with a high contrast ratio can be obtained.

(Image Recording Set and Image Recording Method)

An image recording set according to the present invention includes at least a rewritable recording medium and an image recording device, and further includes other members as appropriate.

The rewritable recording medium is the rewritable recording medium according to the present invention.

<Image Recording Device>

The image recording device is used for recording an image on the rewritable recording medium, and includes a heating unit and at least one of an electric field applying unit and a magnetic field applying unit, preferably includes an image erasing unit, and further includes other units as appropriate.

The heating unit, at least one of the electric field applying unit and the magnetic field applying unit, and the image erasing unit do not necessarily have to be installed in this order, and can be freely installed.

An image recording method (first image recording method) according to the present invention includes at least a heating step and an image forming step (first image forming step), preferably includes an image erasing step, and further includes other steps as appropriate.

The heating step, the first image forming step, and the image erasing step do not necessarily have to be set in this order, and can be freely set.

An image recording method (second image recording method) according to the present invention includes at least an applying step and an image forming step (second image forming step), preferably includes an image erasing step, and further includes other steps as appropriate.

The applying step, the second image forming step, and the image erasing step do not necessarily have to be set in this order, and can be freely set.

The image recording method can be preferably carried out by the image recording set.

The image recording device is a so-called externally-driven image recording device that is not integral with the rewritable recording medium.

—Heating Unit and Heating Step—

The heating unit is a unit configured to heat the rewritable recording medium, and is not particularly limited and can be selected as appropriate according to the purpose as long as it is a unit configured to heat the rewritable recording medium to a temperature equal to or higher than the gel-to-sol (liquefaction) transition temperature of the dispersion medium in the image recording layer of the rewritable recording medium.

The heating unit to be used for heating the entire image recording layer of the rewritable recording medium and the heating unit to be used for heating a part of the image recording layer are different and selectively used according to the image recording method. The former is applied, for example, when an image is recorded (formed) by applying an electric field and/or a magnetic field to at least a part of the image recording layer after converting the dispersion medium into a sol by heating the entire image recording layer. The latter is applied, for example, when an image is recorded (formed) by converting the dispersion medium into a sol by heating at least a part of the image recording layer after (or while) applying an electric field and/or a magnetic field to the entire image recording layer.

For heating the entire image recording layer, for example, a fixing unit that is used for an electrophotographic copying machine and a printer is preferably used. In detail, it is, for example, a heating roller.

The heating step is not particularly limited and can be selected as appropriate according to the purpose as long as it is a step of heating the rewritable recording medium. It is, for example, a step of heating the entire image recording layer of the rewritable recording medium. The heating step can be performed by, for example, the heating unit.

Figure 10:
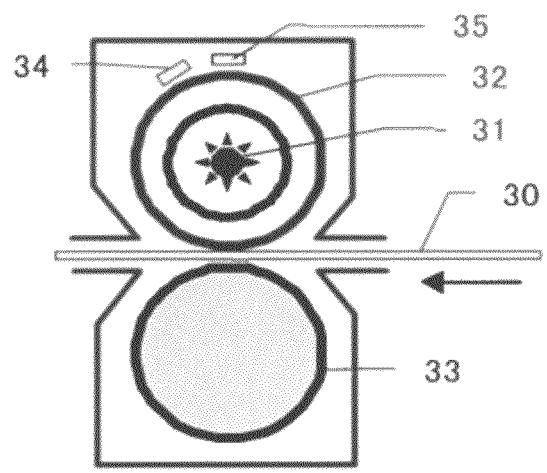
FIG. 10 is a schematic view showing an example of a heating unit of an image recording device in an image recording set according to the present invention.

An example of the heating unit using a heating roller is shown in FIG. 10. The heating unit shown in FIG. 10 includes a heating roller 32 containing a heat source 31, a pressurizing roller 33, a fast-responsive thermistor 34, and an overheat-preventive thermostat 35. The heat source 31 is a halogen heater or a ceramic heater. The heating roller 32 preferably has a configuration in which Si rubber is covered on a core metal with high rigidity such as iron and SUS. As the pressurizing roller 33, a coating with a thickness of approximately 100 μm of Si rubber, fluorine-contained rubber or fluorine resin is coated on a core metal for smoothly feeding and preventing twining of a transfer material. In addition, it is preferable that a pressurizing arm is provided on an end portion of the pressurizing roller 33, and spring suspension is provided to allow a load to be applied between the pressurizing roller and the heating roller 32. A method is also possible that the pressurizing roller 33 is a heat roller enclosing a heater so as to heat the recording medium from both of the recording surface side and the back surface side, and this is effective for increasing the recording speed of the rewritable recording medium 30.

Figure 11:
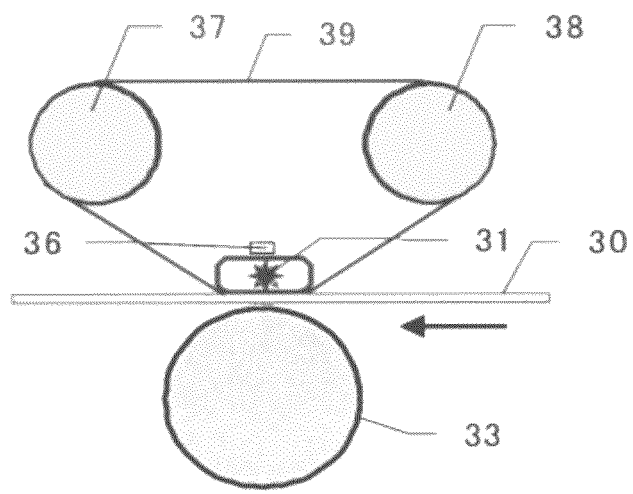
FIG. 11 is a schematic view showing another example of the heating unit of the image recording device in the image recording set according to the present invention.

In addition, as shown in FIG. 11, a unit including a rotating body 39 of a belt-like film disposed in contact with the rewritable recording medium 30 and a heat source 31 fixed on the inner side of the film so as to face the rewritable recording medium 30 can also be used. This has advantages such as shortening the warm-up time and reducing the power consumption. In this heating unit, a rotating body 39 of a belt-like film is rotated by a roller 37 and a roller 38. The pressurizing roller 33 pressurizes the rewritable recording medium 30. A temperature sensor 36 adjusts the temperature of the heat source 31.

The heating unit is, for example, an IH (Electromagnetic Induction Heater) type device. In the IH type, when a high-frequency power source (inverter) is connected to an exciting coil and a high-frequency current is supplied to the exciting coil, a high-frequency magnetic field is generated around an IH coil, and due to this magnetic field, an eddy current flows to a magnetic metal member and Joule heat is generated, whereby performing heating.

On the other hand, for recording an image on the rewritable recording medium to which an electric field and/or a magnetic field is applied by heating a part of the image recording layer, a thermal head can be used. The thermal head is a device that performs recording on a recording medium by heating aligned heat resisting elements by selectively applying a potential according to image data to be recorded.

The thermal head is not particularly limited and can be selected as appropriate according to the purpose as long as it is capable of heating the dispersion medium to a temperature equal to or higher than the gel-to-sol transition temperature.

—Electric Field Applying Unit and Magnetic Field Applying Unit, and Electric Field Application and Magnetic Field Application—

The image recording device includes at least one of an electric field applying unit configured to apply an electric field to the rewritable recording medium and a magnetic field applying unit configured to apply a magnetic field (to the rewritable recording medium).

—Electric Field Applying Unit—

The electric field applying unit is not particularly limited and can be selected as appropriate according to the purpose as long as it is a unit configured to apply an electric field to the rewritable recording medium.

The electric field applying unit to be used for applying an electric field to the entire image recording layer of the rewritable recording medium and the electric field applying unit to be used for applying an electric field to a part of the image recording layer are different and selectively used according to the image recording method. The former is used, for example, when image recording (forming) is performed by the heating unit after (or while) an electric field is applied to the entire image recording layer. The latter is used, for example, when image recording (forming) is performed by applying an electric field to a part of the image recording layer after the entire image recording layer is heated by the heating unit.

As the electric field applying unit configured to apply an electric field to the entire image recording layer of the rewritable recording medium, various chargers and dischargers are used, and for example, a corona charger, a roller charger and a solid discharger are used.

The corona charger is a member that charges the rewritable recording medium by applying a high voltage to a wire, ionizing the air around the wire, and moving the ions to the surface of the rewritable recording medium, and has advantages of non-contact, high-speed followability, and high charge uniformity. The corona charger is formed by laying discharge wires such as tungsten wires and stainless steel wires with a diameter of 40 μm to 100 μm in 1 to 3 rows in a shield case provided with corrosion resistance, and gold-plated discharge wires are used for reducing discharge unevenness in many cases. As the corona charger, there are a corotron type without a grid and a scorotron type using metal thin wires or punching metal as a grid (control grid or suppressor grid). The discharge state is different between the case where a positive voltage is applied to the discharge wire and the case where a negative voltage is applied to the discharge wire, and when a positive voltage is applied, discharge occurs uniformly along the wire, and on the other hand, when a negative voltage is applied, discharge becomes point-like. Therefore, when a positive voltage is applied, charging becomes substantially uniform even without a grid, and on the other hand, when a negative voltage is applied, charge unevenness assuming linear shading occurs without a grid, so that a scorotron type provided with a grip is preferable for uniform charging.

The roller charger is brought into contact with or disposed in proximity to the rewritable recording medium and can provide charges on the entire surface of the rewritable recording medium while rolling with respect to the movement of the rewritable recording medium. The roller charger generally consists of two layers of an elastic layer and a top surface layer on a core metal, and in particular, for the elastic layer, medium-resistance rubber, for example, hydrin rubber or urethane rubber is used. In these rubbers, a resistance control material such as carbon, graphite, activated carbon fiber, and an ionic conductor is dispersed to control the volume resistivity to $10^5 \Omega \cdot cm$ to $10^8 \Omega \cdot cm$. The roller charger produces less ozone and NOx and allows setting of a low applied voltage, so that it is effective for reducing power consumption.

The electric field applying unit configured to apply an electric field to a part of the image recording layer of the rewritable recording medium is not particularly limited and can be selected as appropriate according to the purpose as long as it can form a latent electrostatic image and can form an image by applying an electric field to the rewritable recording medium according to the present invention.

A method for forming a latent electrostatic image is, for example, an electrophotographic method or an ion irradiation method. These can be particularly effectively used in the present invention. To apply an electric field, a counter electrode is disposed at a position opposed to the electric field applying unit via the rewritable recording medium.

—Electrophotographic Electric Field Applying Unit—

The electrophotographic electric field applying unit is not particularly limited and can be selected as appropriate according to the purpose, and is, for example, a unit configured to form a latent electrostatic image on the surface of an image bearing member by charging the image bearing member and then expose it corresponding to an image pattern.

On the rewritable recording medium according to the present invention, an image can be recorded by contact of the rewritable recording medium with the surface of an image bearing member on which a latent electrostatic image is formed.

The electrophotographic electric field applying unit includes at least an image bearing member, preferably includes a charger and an exposing unit, and further includes other members such as a neutralizing unit as appropriate. Further, to apply an electric field to the rewritable recording medium, a counter electrode is disposed at a position opposed to the image bearing member as the electric field applying unit via the rewritable recording medium.

—Image Bearing Member—

The image bearing member is not particularly limited and can be selected as appropriate according to the purpose as long as it can form a latent electrostatic image, and is, for example, a single-layer type consisting of a single photosensitive layer containing a mixture of charge generating substance and charge transporting substance on a conductive support formed of a tube or belt of aluminum or nickel, and a lamination type including a lamination of a charge generating layer and a charge transporting layer. Further, it may also be a highly-durable type including a protective layer provided on the top surface.

The image bearing member can be used both positively charged and negatively charged, however, the amount of hole-transport substance is richer than the amount of electron-transport substance, so that it is more preferable to use a negatively charged type due to the electrostatic characteristics (in this case, black electrophoretic particles are positively charged). However, in the case of a single-layer type, electron transportation and hole transportation are possible, so that it may also be a positively charged type.

—Charger—

The charger is not particularly limited and can be selected as appropriate according to the purpose as long as it can charge the image bearing member, and is, for example, a corona charger, a roller charger, a solid discharger or a brush charger. Among these, a corona charger and a roller charger are preferable.

—Exposing Unit—

The exposing unit is not particularly limited and can be selected as appropriate according to the purpose as long as it can form a latent electrostatic image on the surface of the image bearing member, and is, for example, a semiconductor laser (LD), a light emitting diode (LED) or an electroluminescence (EL). Among these, a semiconductor laser (LD) and a light emitting diode (LED) are preferable.

—Neutralizing Unit—

The neutralizing unit is not particularly limited and can be selected as appropriate according to the purpose as long as it can totally erase a latent electrostatic image formed on the surface of the image bearing member. It is, for example, a semiconductor laser (LD), a light emitting diode (LED), an electroluminescence (EL), a fluorescent light, a tungsten lamp or a halogen lamp. Among these, a light emitting diode (LED) is preferable.

—Other Units—

The other units are, for example, a cleaning unit and a lubricating substance applying unit.

The cleaning unit is used for the purpose of removing foreign matter and discharge products adhered to the surface of the image bearing member.

The cleaning unit is not particularly limited and can be selected as appropriate according to the purpose, and is, for example, a blade or a brush. The cleaning unit is preferably provided in contact with the image bearing member.

The lubricating substance applying unit is used for the purpose of enhancing mold releasability of the surface of the image bearing member and removing discharge products used in combination with the cleaning unit.

The lubricating substance applying unit is not particularly limited and can be selected as appropriate according to the purpose, and is, for example, a brush. The lubricating substance applying unit is preferably disposed in contact with the image bearing member and a solidified lubricating substance. When the lubricating substance applying unit is a brush, the lubricating substance is provided onto the surface of the image bearing member by rotation of the brush.

The lubricating substance is, for example, wax, fluorine-containing resin, silicone resin, polyolefin-based resin or metal salt of a fatty acid. Among these, metal salt of a fatty acid is preferable, and zinc stearate is more preferable.

—Counter Electrode—

The counter electrode is disposed at a position opposed to the image bearing member so as to sandwich the rewritable recording medium.

The material of the counter electrode is not particularly limited and can be selected as appropriate according to the purpose as long as it conducts electricity, and is, for example, metal such as platinum, gold, silver, copper, aluminum, zinc, nickel, titanium, and bismuth, alloys of these and carbon.

The counter electrode needs to be increased in adhesion to the rewritable recording medium, so that, for example, a conductive roll member with elasticity is effectively used as the counter electrode.

Figure 12:
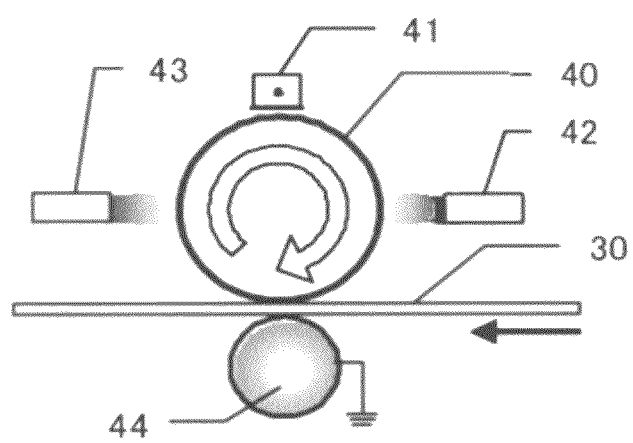
FIG. 12 is a schematic view showing an example of an electric field applying unit of the image recording device in the image recording set according to the present invention.

An example of the electric field applying unit using an image bearing member in the image recording device is shown in FIG. 12. On the recording surface side of the rewritable recording medium 30, an image bearing member 40 is provided in contact with the rewritable recording medium 30, and on the back surface side of the rewritable recording medium 30, a counter electrode 44 is provided at a position opposed to the image bearing member 40 so as to sandwich the rewritable recording medium 30. Around the image bearing member 40, at least a charger 41 for charging the image bearing member 40, an exposing unit 42 for forming a latent electrostatic image on the surface of the image bearing member 40, and a neutralizing unit 43 for erasing a latent electrostatic image on the surface of the image bearing member 40, are provided.

—Ion Irradiation Type Electric Field Applying Unit—

The ion irradiation type electric field applying unit includes, for example, an ion flow generating section generally made of a discharge body, an electrode that controls a generated ion flow, and an opening for releasing an ion flow. The flow volume of ions generated in the ion flow generating section is controlled by an electric field.

With the ion irradiation type, under an atmosphere in which ion generation is possible such as in the atmosphere, a latent electrostatic image can be directly formed by irradiation of ions generated by discharge from a discharge electrode, so that an image can be directly recorded on the rewritable recording medium.

As the ion irradiation type, for example, a heating discharge type is known (JP-B No. 3725092) in which discharge is generated by selectively heating discharge electrodes in a state where a voltage (discharge control voltage) that does not generate discharge only by being applied to the discharge electrodes but generates discharge by heating is applied. This type includes discharge electrodes and heating elements disposed corresponding to the respective discharge electrodes, and discharge is not generated only by applying a voltage to the discharge electrodes, and discharge is generated by heating. Therefore, ion generation can be controlled by the presence/absence of heating elements, and lower-voltage driving, cost reduction, and downsizing of the device are realized.

A detailed ion irradiation type electric field applying unit is, for example, an ion irradiation head including the above-described mechanism. The ion irradiation head includes a discharge body, and a heating member and other members as appropriate. At a position opposed to the ion irradiation head via the rewritable recording medium, a counter electrode is disposed.

In the rewritable recording medium according to the present invention, the dispersion medium of the image recording layer is converted into a liquid by heating and image recording is enabled, so that this type that applies heating for image recording is very suitably used for the rewritable recording medium. In the image recording device, it is also possible that this one ion irradiation device (ion irradiation head) is used to serve as both of the heating unit and the electric field applying unit, and this is effective for cost reduction, reduction in power consumption, and downsizing of the device, however, the recording speed and the image quality may deteriorate, so that it must be used depending on the intended use.

Figure 13:
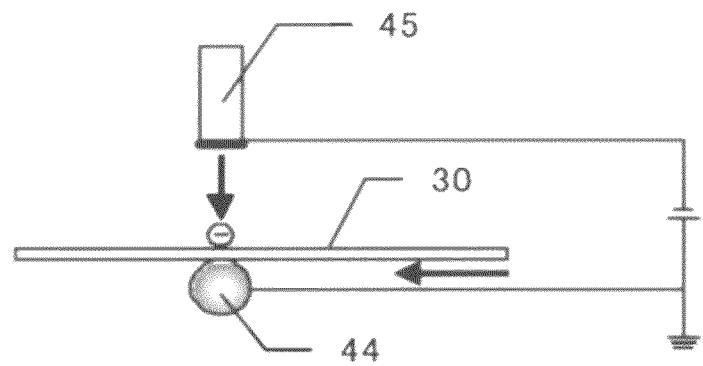
FIG. 13 is a schematic view showing another example of the electric field applying unit of the image recording device in the image recording set according to the present invention.

An example of an electric field applying unit by an ion irradiation type is shown in FIG. 13. In FIG. 13, at a position opposed to the ion irradiation head, a counter electrode 44 is provided so as to be in contact with the back surface of the rewritable recording medium 30, and the ion irradiation head 45 is provided in contact with or in proximity to the recording surface of the rewritable recording medium 30. Inside the ion irradiation head 45, a discharge body not illustrated, and a heating member if necessary, are provided, and in the case of the heating discharge type, a voltage is applied to a region in which discharge is generated by heating, and ion irradiation is carried out by temperature control by using the heating member.

Ions that passed through the opening of the ion irradiation head adhere to the rewritable recording medium according to an electric field formed between the ion irradiation head and the counter electrode, and accordingly, an image is recorded.

—Magnetic Field Applying Unit—

The magnetic field applying unit is not particularly limited and can be selected as appropriate according to the purpose as long as it is a unit configured to apply a magnetic field to the rewritable recording medium, and is, for example, a unit configured to form a latent magnetic image and apply a magnetic field to the rewritable recording medium according to the present invention.

Similarly to the electric field applying unit, the magnetic field applying unit to be used for applying a magnetic field to the entire image recording layer of the rewritable recording medium and the magnetic field applying unit to be used for applying a magnetic field to a part of the image recording layer are different and selectively used according to the image recording method. The former is applied, for example, in the case where an image is recorded (formed) by the heating unit while applying a magnetic field to the entire image recording layer. The latter is applied, for example, in the case where an image is recorded (formed) by applying a magnetic field to a part of the image recording layer after heating the entire image recording layer by the heating unit.

The magnetic field applying unit configured to apply a magnetic field to the entire image recording layer of the rewritable recording medium is preferably a magnet, in particular, a permanent magnet such as an alnico magnet, ferrite magnet, neodymium magnet, and samarium-cobalt magnet, or electromagnet, and particularly preferably an electromagnet. The electromagnet is formed by winding a coil around a ferromagnetic iron core with high magnetic permeability, and when a current is supplied to the coil, due to its magnetic field, the iron core is magnetized and becomes a magnet, and when the current is cut off, the iron core returns to an unmagnetized state.

On the other hand, the magnetic field applying unit configured to apply a magnetic field to a part of the image recording layer of the rewritable recording medium is not particularly limited and can be selected as appropriate according to the purpose as long as it is a unit configured to form a latent magnetic image and form an image by applying a magnetic field to the rewritable recording medium according to the present invention. It is, for example, a magnetic head to be used for a magnetography magnetic printer.

—Magnetic Head—

The magnetic head is enabled to form a latent magnetic image when leakage magnetic flux is generated from the magnetic pole tip end portion by supplying a current to the coil of each channel. By scanning the rewritable recording medium by the magnetic head, magnetophoretic particles of the rewritable recording medium are made to migrate, and an image is recorded on the recording medium. However, as the magnetic head, there are a multi-channel type and a full-line type, and a full-line type including aligned multichannel heads enables high-speed recording without the need of scanning of the heads. The material of the head is preferably a soft magnetic material to be used for a high-permeability core. The soft magnetic material is, for example, a high-permeability material with low coercivity and high saturation flux density such as Fe—Si—B—C amorphous alloy, FeP, permalloy (NiFe alloy), FeCoP, CoP, FeB, FeBSi, and silicon steel.

The magnetic printer is capable of forming a latent magnetic image on a latent magnetic image bearing member (image bearing member) by using a magnetic head, and in the present invention, is also capable of performing recording by bringing the rewritable recording medium according to the present invention into contact with the latent magnetic image bearing member on which a latent magnetic image is formed.

For the image recording device, the electric field applying unit and the magnetic field applying unit can be used together.

The electric field applying unit and the magnetic field applying unit are used together, and both of the electrophoretic particles and the magnetophoretic particles are used in the rewritable recording medium according to the present invention and these particles are made different in color from each other, and accordingly, multicolor is realized.

—First Image Forming Step and Second Image Forming Step—

The first image forming step is not particularly limited and can be selected as appropriate according to the purpose as long as it is a step of forming an image by applying at least one of an electric field and a magnetic field to at least a part of the heated image recording layer of the rewritable recording medium, and can be performed by, for example, at least one of the electric field applying unit and the magnetic field applying unit.

The second image forming step is not particularly limited and can be selected as appropriate according to the purpose as long as it is a step of forming an image by heating at least a part of the image recording layer of the rewritable recording medium to which at least one of the electric field and the magnetic field is applied, and can be performed by, for example, the heating unit.

—Image Erasing Unit and Image Erasing Step—

The image erasing step is not particularly limited and can be selected as appropriate according to the purpose as long as it is a unit configured to erase an image recorded on the rewritable recording medium by applying at least one of an electric field and a magnetic field to the rewritable recording medium.

The image erasing step is not particularly limited and can be selected as appropriate according to the purpose as long as it is a step of erasing an image recorded on the rewritable recording medium by applying at least one of an electric field and a magnetic field to the rewritable recording medium, and can be performed by, for example, the image erasing unit.

—Unit configured to Erase Image by Applying Electric Field—

The unit configured to erase an image by applying an electric field is not particularly limited and can be selected as appropriate according to the purpose, and is, for example, an image erasing unit including a counter electrode and a charger or discharger.

The counter electrode is, for example, the counter electrode described in the description of the electrophotographic electric field applying unit.

The charger or discharger is, for example, the electric field applying unit described in the description of the electrophotographic electric field applying unit, such as a corona charger, a roller charger, and a solid discharger.

—Unit Configured to Erase Image by Applying Magnetic Field—

The unit configured to erase an image by applying a magnetic field is not particularly limited and can be selected as appropriate according to the purpose, however, a magnetic field applying unit capable of applying a magnetic field to the entire image recording layer of the rewritable recording medium is preferable because it can be effectively used as an image erasing unit. Such a unit is, for example, permanent magnet or electromagnet.

By scanning the rewritable recording medium or the permanent magnet in a state where the permanent magnet is brought into contact with the recording surface and/or the back surface of the rewritable recording medium, a recorded image can be totally erased.

The electromagnet is capable of controlling its magnetic force by means of turning ON/OFF of current supply, so that for example, a head including aligned electromagnets is provided, and the head is scanned with respect to the entire surface of the rewritable recording medium in a state where the current supply is turned ON, whereby totally erasing a recorded image.

—Other Units and Other Steps—

The other units are, for example, a cooling unit.

The other steps are, for example, a cooling step.

—Cooling Unit and Cooling Step—

The cooling step is not particularly limited and can be selected as appropriate according to the purpose as long as it is a unit configured to cool the image recording layer of the rewritable recording medium to a temperature equal to or lower than the sol-to-gel transition temperature of the dispersion medium, and is, for example, a cooling fan, a cooling roller or a cooling belt. As the cooling roller and the cooling belt, for example, a water-cooling system inside which water is circulated can be adopted.

The cooling step is not particularly limited and can be selected as appropriate according to the purpose as long as it is a step capable of cooling the rewritable recording medium, and is performed by, for example, the cooling unit or natural cooling.

By the cooling unit and the cooling step, the dispersion medium is converted into a gel soon after image recording, and image defects can be prevented, so that higher image quality is realized.

The image recording device of the image recording set according to the present invention includes at least the heating unit and at least one of the electric field applying unit and the magnetic field applying unit, and preferably includes the image erasing unit, however, it is also possible that two or more units of the heating unit, at least one of the electric field applying unit and the magnetic field applying unit, and the image erasing unit are combined as one unit, and this is effective for cost reduction, reduction in power consumption, and downsizing of the device.

In detail, it is also possible that the heating unit and the electric field applying unit are combined so that an electric field is applied while heating. For example, the ion irradiation head is provided with a heating member, or a drum heater is mounted on the image bearing member capable of forming a latent electrostatic image.

It is also possible that the image erasing unit and the electric field applying unit are combined so that image recording is performed subsequently to total image erasing.

For example, after an image on the rewritable recording medium is totally erased by using the electric field applying unit, an image can be formed by using the same electric field applying unit.

Similarly, it is also possible that the heating unit, the image erasing unit, and at least one of the electric field applying unit and the magnetic field applying unit are combined.

For example, with use of an image bearing member on which a drum heater as a heating member is mounted, first an entirely-solid pattern is output to erase an image on the rewritable recording medium, and subsequently, an image pattern can be output.

For the image recording device of the image recording set according to the present invention, a combination of the heating unit, the image erasing unit, and at least one of the electric field applying unit and the magnetic field applying unit can also be used as described above, and all combinations are included in the scope of the present invention.

The heating unit, the image erasing unit, and at least one of the electric field applying unit and the magnetic field applying unit are not limited to one in number, and may be plural in number. In particular, by installing a plurality of the heating unit, the image quality may be improved. For example, until an image is recorded after the rewritable recording unit passes through the first heating unit, by maintaining the temperature by the plurality of heating unit, a stable image can be formed in any temperature environment. In particular, when an image bearing member is used as the electric field applying unit, if the image bearing member as the electric field applying unit is cold although the rewritable recording medium is heated in advance by the heating unit, gelatinization of the dispersion medium may start when it comes into contact with the image bearing member, so that in some cases, it is more effective that a drum heater as a heating member is mounted on the image bearing member to keep a high temperature until image recording is ended.

Examples of electrophoretic type image recording methods using the rewritable recording medium according to the present invention are described with reference to FIG. 14 and FIG. 15. The present invention is not limited to these.

Figure 14:
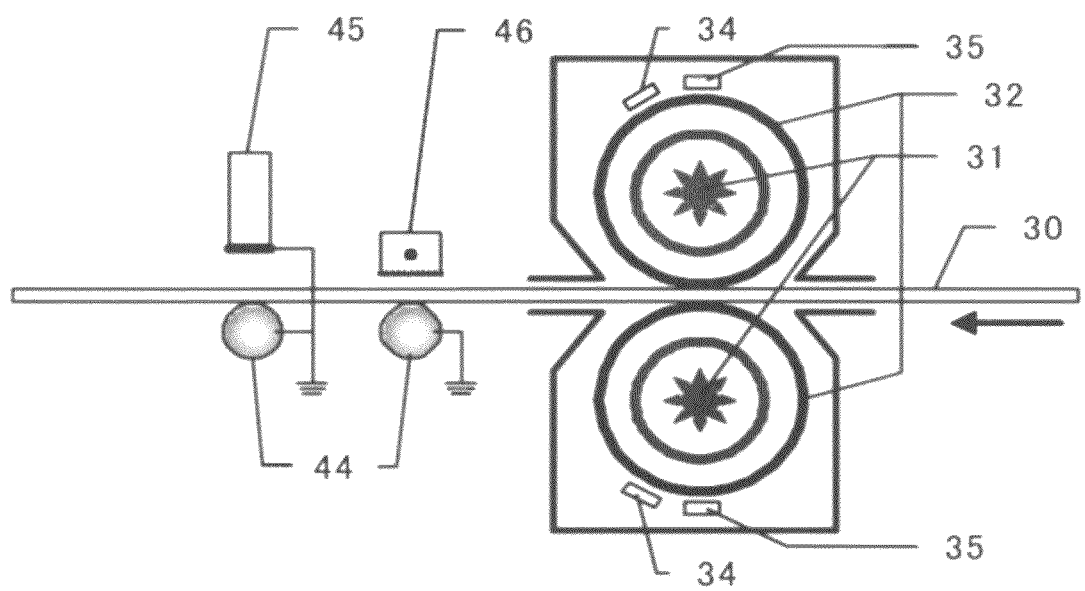
FIG. 14 is a schematic view showing an example of an image recording device in the image recording set according to the present invention.

The image recording device described in FIG. 14 includes a heating unit that includes heating rollers 32 containing heat sources 31 and provided on both the recording surface and the back surface of the rewritable recording medium 30, an image erasing unit 46 that totally erases records by using a corona charger from the entire recording surface of the rewritable recording medium 30, an ion irradiation head 45 that applies an electric field to the rewritable recording medium 30, and counter electrodes 44 provided so as to come into contact with the back surface of the rewritable recording medium 30 at the time of total record erasing and electric field application for image forming. The heating unit further includes a fast-response thermistor 34 and a thermostat 35.

Figure 15:
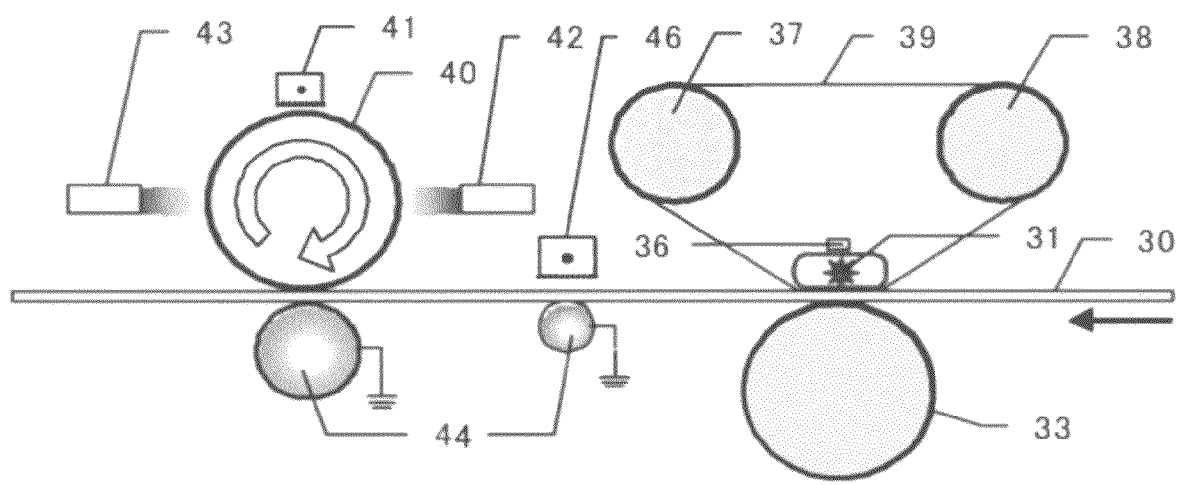
FIG. 15 is a schematic view showing another example of the image recording device in the image recording set according to the present invention.

The image recording device described in FIG. 15 includes a heating unit configured to heat the rewritable recording medium 30 via a rotating body 39 for a belt-like film laid in contact with a heat source 31, an image erasing unit 46 that totally erases records by using a corona charger from the entire recording surface of the rewritable recording medium 30, an electric field applying unit including an image bearing member 40 that can repeatedly form a latent electrostatic image by a charger 41, an exposing unit 42, and a neutralizing unit 43, and counter electrodes 44 provided so as to come into contact with the back surface of the rewritable recording medium 30 at the time of total record erasing and electric field application for image forming. In the heating unit, a rotating body 39 for a belt-like film is rotated by a roller 37 and a roller 38. The rewritable recording medium 30 is pressurized by a pressurizing roller 33. The temperature of the heat source 31 is adjusted by a temperature sensor 36.

As shown in FIG. 14 and FIG. 15, in the rewritable recording medium 30, the dispersion medium of the rewritable recording medium is converted into a liquid by the action of the thermoreversible gelling agent contained in the dispersion medium when it is heated by the heating unit, and electrophoretic particles dispersed in the dispersion medium are accordingly enabled to move. Next, by uniformly applying a voltage to the entire recording surface of the rewritable recording medium 30 by the image erasing unit 46 that totally erases records from the rewritable recording medium 30, the recording surface side of the recording layer is filled with electrophoretic particles with the same polarity and the same color, whereby totally erasing records from the recording surface. For example, when negatively charged white electrophoretic particles and positively charged black electrophoretic particles are contained in the dispersion medium, by applying positive charging by the image erasing unit 46, the recording surface side is filled with the negatively charged white electrophoretic particles, and the entire surface of the rewritable recording medium 30 becomes white. Subsequently, by providing a latent electrostatic image corresponding to an image pattern onto the rewritable recording medium 30, the image pattern is recorded on the rewritable recording medium 30. For example, when a latent electrostatic image whose image region is negative is provided onto the rewritable recording medium 30, in the image region, the positively charged black electrophoretic particles move to the recording surface side, and in the non-image region, particle movement does not occur, so that a black image pattern is recorded on the rewritable recording medium 30. Thereafter, when the rewritable recording medium 30 is cooled to a room temperature, the dispersion medium in the rewritable recording medium 30 turns into a gel by the action of the thermoreversible gelling agent, and accordingly, the electrophoretic particles contained in the dispersion medium become immovable, so that the image is stably retained for a long period of time even if stimulus is applied thereto from the outside.

EXAMPLES

Hereinafter, examples of the present invention are described, however, the present invention should not be limited to the following examples at all. Here, "part" means "part by mass."

<Sol-Gel Transition Temperatures>

First, a method for measuring sol-gel transition temperatures is described below.

The thermoreversible gelling agent was added into the dispersion medium, heated, dissolved by stirring, and then cooled, and accordingly, a 5% by mass gel was obtained, and sol-gel transition temperatures of the obtained gel were measured by differential scanning calorimetry (DSC, measuring device: DSC Q200 manufactured by TA Instruments). As measuring conditions, the measurement was made in cycles in which the temperature was raised from 10° C. to 90° C. at a rate of 2° C. per minute, and lowered in the same manner at a rate of 2° C. per minute. The endothermic peak temperature in the temperature rise obtained by DSC measurement was recognized as the gel-to-sol transition temperature, and the exothermic peak temperature in the temperature lowering was recognized as the sol-to-gel transition temperature.

Example 1

<Fabrication of White Electrophoretic Particles>

Put in a reaction container containing a stirrer and a temperature controller was a solvent obtained by mixing 93 parts of ethanol and 7 parts of water and adjusted to pH 4.5 with glacial acetic acid. 16 parts of 3-(trimethoxysilyl)propyl methacrylate was added and dissolved, and then, 100 parts of titanium oxide was added, and stirred for 10 minutes. Then, 180 parts of ethanol was added and stirred, and a solid content collected by centrifugal separation was left for twenty-four hours, and then vacuum-dried for 4 hours at 70° C., whereby obtaining surface-treated titanium oxide.

Next, 130 parts of toluene and 100 parts of lauryl methacrylate were put in a reaction container containing a stirrer, a thermometer, and a reflux condenser, and dissolved. 50 parts of toluene in which 75 parts of the above-described surface-treated titanium oxide and 0.5 parts of azobisisobutyronitrile were dissolved was further added, and heated and stirred for 6 hours at 70° C. under a nitrogen atmosphere. After the reaction ended, a solid content was washed with toluene by repeating centrifugal separation, and finally, vacuum drying was performed for 4 hours at 70° C., whereby obtaining the target white electrophoretic particles (mean particle diameter: 400 nm).

<Fabrication of Black Electrophoretic Particles>

The black electrophoretic particles were fabricated based on the method for manufacturing composite particles described in JP-A No. 2005-265938. First, a solution obtained by dissolving 14 parts of methacryloxypropyl-modified silicone (SILAPLANE FM-0711 made by Chisso Corporation), 6 parts of dimethylaminoethyl methacrylate, (made by Tokyo Chemical Industry Co., Ltd.), and 0.1 parts of azobisdimethyl valeronitrile that was a polymerization initiator into 180 parts of silicone oil (KF-96L-lcs made by Shin-Etsu Chemical Co., Ltd.) was stored in a container, and heated for 6 hours at 60° C. under a nitrogen atmosphere. After the reaction ended, the silicone oil was removed by vaporization, whereby obtaining a dispersant A.

Next, in a reaction container containing a stirrer, a thermometer, and a reflux condenser, 1 part of the dispersant A, 1.5 parts of carbon black, and 200 parts of silicone oil (KF-96 made by Shin-Etsu Chemical Co., Ltd.) were mixed and irradiated with ultrasonic waves for 1 hour by a homogenizer while being ice-cooled, whereby dispersing carbon black. Further, 6 parts of methyl methacrylate, 3 parts of methacryloxypropyl-modified silicone (SILAPLANE FM-0725 made by Chisso Corporation), 0.1 parts of N,N-dimethylaminopropyl acrylamide, and 0.05 parts of azobisdimethyl valeronitrile as a polymerization initiator were added, and reacted for 6 hours at 60° C. under a nitrogen atmosphere. After the reaction ended, only a solid content was collected and dried, whereby obtaining the target black electrophoretic particles (mean particle diameter: 300 nm).

<Fabrication of Image Recording Layer Forming Material>

40 parts of the white electrophoretic particles obtained as described above, 39 parts of isoparaffin-based hydrocarbon solvent (ISOPAR G made by Exxon Mobil Corporation), 0.5 parts of a dispersant B (SOLSPERSE 17000 made by Zeneca Inc.), and 0.5 parts of a surfactant (RHEODOL SP-030V made by Kao Corporation) were mixed and subjected to ultrasonic dispersion for 60 minutes. On the other hand, 2 parts of the black electrophoretic particles obtained as described above and 18 parts of isoparaffin-based hydrocarbon solvent (ISOPAR G made by Exxon Mobil Corporation) were mixed and subjected to ultrasonic dispersion for 60 minutes. These were mixed and further subjected to ultrasonic dispersion for 120 minutes, whereby obtaining a dispersion liquid. The obtained dispersion liquid was heated to 60° C., and then 3 parts of a thermoreversible gelling agent represented by the following structural formula (10-1) was added and stirred, and ultrasonic dispersion was performed for 60 minutes while the temperature was kept, whereby fabricating the image recording layer forming material.

The gel-to-sol transition temperature of the isoparaffin-based hydrocarbon solvent by the action of the thermoreversible gelling agent was 51° C., and the sol-to-gel transition temperature was 41° C.

A (the number of silicon atoms)/B (the total number of amide bonds (—NHCO—) and urethane bonds (—NHCOO—) in the molecule) was 1.0.

The thermoreversible gelling agent represented by the following structural formula (10-1) was synthesized by referring to the silicone derivative synthesis method described in JP-A No. 2005-232108.

Structural formula (10-1)

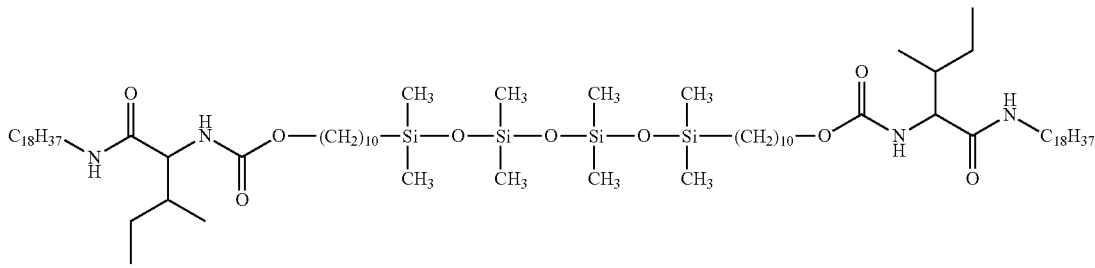

<Fabrication of Rewritable Recording Medium>

A polyethylene terephthalate (PET) film with a thickness of 50 μm was placed on a hot plate heated to 60° C. and simply fixed, and thereafter, a spacer (PET film) with a thickness of 50 μm having adhesive surfaces on both surfaces was stuck like a frame on the end portion of the PET film, a separator wall was provided to prevent the dispersion liquid from infiltrating into the spacer, and heating was sufficiently performed at 60° C. A clearance was provided at a part of the spacer to secure an outlet for the dispersion liquid and air. Next, a proper amount of spacer particles with a particle diameter of 50 μm (MICROPEARL made by Sekisui Chemical Co., Ltd.) was put on the PET film enclosed by the spacer, and the image recording layer forming material kept warm at 60° C. was uniformly poured, and cooled to a room temperature. After confirming the image recording layer forming material was in a gel form, a PET film with a thickness of 25 μm was placed thereon from the end portion and bonded to the spacer while being pressed by a roller so as to prevent air from entering therebetween, and finally, the entire end portion of the recording medium was sealed by using an ultraviolet curable sealant, whereby fabricating the rewritable recording medium according to the present invention.

<Evaluation Using Image Recording Device>

As the image recording device, an electrophotographic type digital copying machine was altered and used. The copying machine is provided with an image bearing member, and around the image bearing member, at least a charging unit, an exposing unit, and a transfer unit. Heating units were set for the image bearing member, the transfer unit, the paper feed tray, and the conveyance route so as to keep them at 60° C. For the transfer unit, a grounded conductive roller was used as a counter electrode in place of a transfer roller, and the transfer current was set to zero. The developing unit, the cleaning unit, and the fixing unit were removed.

—Image Quality—

In a state where the rewritable recording medium fabricated as described above was kept warm at 60° C., the dispersion medium was converted into a liquid, and the image erasing process was applied by positively charging the entire surface of the rewritable recording medium to make the entire surface white. Thereafter, the rewritable recording medium was set in the paper feed tray of the image recording device and heated, and in the state where the dispersion medium is a liquid, when an image pattern was output, it was confirmed that a black image pattern on the white background was clearly recorded on the rewritable recording medium.

—Image Retainability—

The rewritable recording medium on which an image pattern was recorded was left under a room temperature for 2 months. During this time, the dispersion medium was kept gelled. When the rewritable recording medium was visually observed after being left, no changes in image quality and image density were observed, and excellent image retainability was shown.

Even when an electrostatically-charged object was brought closer to the rewritable recording medium, no changes in image quality and image density were observed, so that it was confirmed that image retainability was excellent against an external factor (static electricity).

—Rewritability—

It was confirmed that, when the entire surface of the rewritable recording medium left for 2 months in the image retainability evaluation was positively charged in a state where it was kept warm at 60° C. again, the entire surface returned to white. Further, it was confirmed that recording (rewriting) and erasing can be repeatedly performed on this rewritable recording medium.

Comparative Example 1

A rewritable recording medium was fabricated in the same manner as in Example 1 except that the image recording layer forming material in Example 1 was replaced by an image recording layer forming material that did not contain a thermoreversible gelling agent.

—Image Quality—

The image erasing process was applied by positively charging the entire surface of the rewritable recording medium fabricated as described above in a state where the rewritable recording medium was kept warm at 60° C. to make the entire surface white. Thereafter, after the rewritable recording medium was set in the paper feed tray of the image recording device used in Example 1 and heated, when various image patterns were output, it was confirmed that a black image pattern on the white background was clearly recorded on the rewritable recording medium.

—Image Retainability—

The rewritable recording medium on which an image pattern was recorded was left under a room temperature for 2 months. When the rewritable recording medium was visually observed after being left, the white portion and the black portion changed to gray, so that the image retainability was insufficient.

When an electrostatically-charged object was brought closer to the rewritable recording medium immediately after the image pattern was recorded thereon, the image became fuzzy, so that it was confirmed that the image retainability was insufficient against an external factor (static electricity).

Example 2

<Evaluation Using Image Recording Device>

The rewritable recording medium fabricated in Example 1 was evaluated by using an image recording device different from that used in Example 1. This image recording device was designed so that the rewritable recording medium can be conveyed linearly, and was provided with a heating unit configured to heat the rewritable recording medium, a corotron electric field applying unit, and a cooling unit using a fan in this order. The heating unit was set so that the surface temperature of the rewritable recording medium reached 60° C. A counter electrode was provided at a position opposed to the electric field applying unit via the rewritable recording medium.

—Image Quality—

The rewritable recording medium fabricated in Example 1 was heated to 60° C. by the heating unit to convert the dispersion medium into a liquid, and further, a white solid image was recorded (image erasing) by positively charging the entire surface of the rewritable recording medium by the electric field applying unit, and thereafter, when the rewritable recording medium was cooled to a room temperature, the dispersion medium turned into a gel. When the density was measured with a portable spectrophotometer (X-RITE 939 manufactured by X-Rite, Inc.), it was 0.18. Thereafter, the rewritable recording medium was heated to 60° C. again by the heating unit to convert the dispersion medium into a liquid, and in this state, a black solid image was recorded by negative charging by the electric field applying unit, and then, the rewritable recording medium was cooled to a room temperature. As a result, the black solid image was clearly recorded on the rewritable recording medium, and when the density was measured with the portable spectrophotometer (X-RITE 939), it was 1.44, so that it was confirmed that high contrast was obtained.

Even when an electrostatically-charged object was brought closer to the rewritable recording medium, no changes in image quality and image density were observed, so that it was confirmed that the image retainability was excellent against an external factor (static electricity). Further, it was confirmed that this effect was obtained even without operating the cooling unit.

The density was measured at 5 positions with the portable spectrophotometer (X-RITE 939), and based on a mean value, the image density was obtained.

—Rewritability—

When the image erasing process and image recording process were alternately repeatedly applied 50 times to the rewritable recording medium in the same manner as described above, no deterioration was observed during image erasing and image recording, so that it was confirmed that repeated rewriting was possible.

Here, "no deterioration was observed" means the image density measured with the portable spectrophotometer (X-RITE 939) was within ±0.05 as compared with the image density before the repeat test.

—Image Retainability—

The rewritable recording medium on which a white solid image was recorded by positive charging by using the electric field applying unit and the rewritable recording medium on which a black solid image was recorded by negative charging were left for 2 months under an environment at 55% RH and 23° C. During this time, the dispersion medium was kept gelled. When the densities on the rewritable recording media after being left were measured with the portable spectrophotometer (X-RITE 939), the density of the white solid image was 0.22, and the density of the black solid image was 1.43, so that excellent image retainability was shown.

Even when an electrostatically-charged object was brought closer to the rewritable recording media, no changes in image quality and image density were observed, so that it was confirmed that image retainability was excellent against an external factor (static electricity).

Example 3

A rewritable recording medium was fabricated in the same manner as in Example 1 except that the thermoreversible gelling agent in Example 1 was replaced by a compound represented by the following structural formula (7-1).

The gel-to-sol transition temperature of isoparaffin-based hydrocarbon solvent by the action of the thermoreversible gelling agent was 45° C., and the sol-to-gel transition temperature was 30° C.

A (the number of silicon atoms)/B (the total number of amide bonds (—NHCO—) and urethane bonds (—NHCOO—) in the molecule) was 1.5.

The thermoreversible gelling agent represented by the following structural formula (7-1) was synthesized by referring to the silicone derivative synthesis method described in JP-A No. 2005-232108.

—Image Quality—

The fabricated rewritable recording medium was heated to 55° C. by the same heating unit as in Example 2 to convert the dispersion medium into a liquid, and further, a white solid image was recorded (image erasing) by positively charging the entire surface of the rewritable recording medium by the same electric field applying unit as in Example 2, and thereafter, when the rewritable recording medium was cooled to a room temperature, the dispersion medium turned into a gel. When the density was measured with the portable spectrophotometer (X-RITE 939 manufactured by X-Rite, Inc.), it was 0.20. Thereafter, the rewritable recording medium was heated to 55° C. again by the heating unit to convert the dispersion medium into a liquid, and in this state, a black solid image was recorded by negative charging by the electric field applying unit, and the rewritable recording medium was cooled to a room temperature. As a result, the black solid image was clearly recorded on the rewritable recording medium, and when the density was measured with the portable spectrophotometer (X-RITE 939), it was 1.43, so that it was confirmed that high contrast was obtained.

Even when an electrostatically-charged object was brought closer to the rewritable recording medium, no changes in image quality and image density were observed, so that it was confirmed that the image retainability was excellent against an external factor (static electricity). Further, it was confirmed that this effect was obtained even without operating the cooling unit.

—Rewritability—

When the image erasing process and image recording process were alternately repeatedly applied 50 times to the rewritable recording medium in the same manner as described above, no deterioration was observed during image erasing and image recording, so that it was confirmed that repeated rewriting was possible.

—Image Retainability—

The rewritable recording medium on which a white solid image was recorded by positive charging by using the electric field applying unit and the rewritable recording medium on which a black solid image was recorded by negative charging were left for 2 months under an environment at 55% RH and 23° C. During this time, the dispersion medium was kept gelled. When the densities on the rewritable recording media after being left were measured with the portable spectrophotometer (X-RITE 939), the density of the white solid image was 0.24, and the density of the black solid image was 1.41, so that excellent image retainability was shown.

Even when an electrostatically-charged object was brought closer to the rewritable recording media, no changes in image quality and image density were observed, so that it was confirmed that image retainability was excellent against an external factor (static electricity).

Structural formula (7-1)

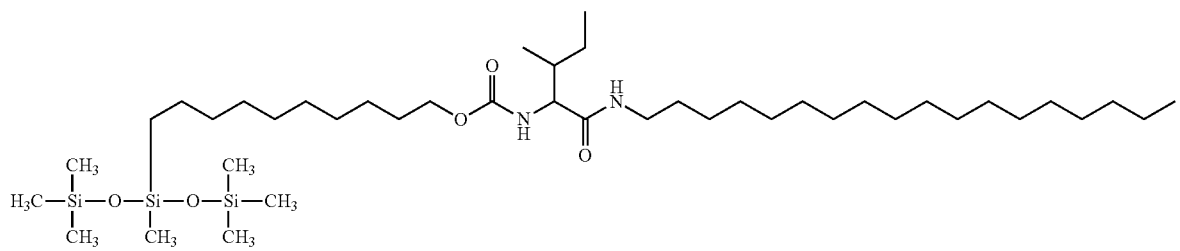

Example 4

A rewritable recording medium was fabricated in the same manner as in Example 1 except that the thermoreversible gelling agent in Example 1 was replaced by a compound represented by the following structural formula (9-1).

The gel-to-sol transition temperature of isoparaffin-based hydrocarbon solvent by the action of the thermoreversible gelling agent was 59° C., and the sol-to-gel transition temperature was 24° C.

A (the number of silicon atoms)/B (the total number of amide bonds (—NHCO—) and urethane bonds (—NH-COO—) in the molecule) was 1.0.

The thermoreversible gelling agent represented by the following structural formula (9-1) was synthesized by referring to the silicone derivative synthesis method described in JP-A No. 2004-182697.

Structural formula (9-1)

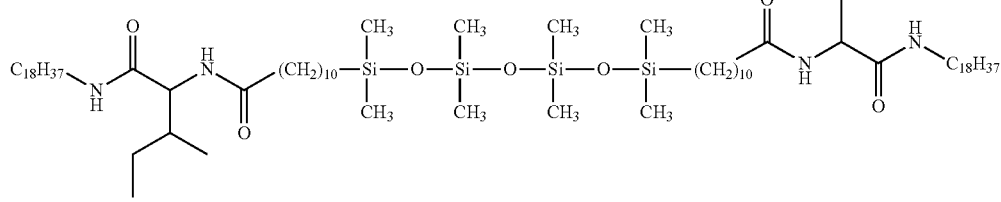

—Image Quality—

The fabricated rewritable recording medium was heated to 65° C. by the same heating unit as in Example 2 to convert the dispersion medium into a liquid, and further, a white solid image is recorded (image erasing) by positively charging the entire surface of the rewritable recording medium by the same electric field applying unit as in Example 2, and thereafter, when the rewritable recording medium was cooled to a room temperature, the dispersion medium turned into a gel. When the density was measured with the portable spectrophotometer (X-RITE 939 manufactured by X-Rite, Inc.), it was 0.19. Thereafter, the rewritable recording medium was heated to 65° C. again by the heating unit to convert the dispersion medium into a liquid, and in this state, a black solid image was recorded by negative charging by the electric field applying unit, and then, the rewritable recording medium was cooled to a room temperature. As a result, the black solid image was clearly recorded on the rewritable recording medium, and when the density was measured with the portable spectrophotometer (X-RITE 939), it was 1.46, so that it was confirmed that high contrast was obtained.

Even when an electrostatically-charged object was brought closer to the rewritable recording medium, no changes in image quality and image density were observed, so that it was confirmed that image retainability was excellent against an external factor (static electricity). However, when an external factor was brought into contact with the rewritable recording medium without operating the cooling unit immediately after recording, a portion where slight inversion occurred was observed.

—Rewritability—

When the image erasing process and image recording process were alternately repeatedly applied 50 times to the rewritable recording medium in the same manner as described above, no deterioration was observed during image erasing and image recording, so that it was confirmed that repeated rewriting was possible.

—Image Retainability—

The rewritable recording medium on which a white solid image was recorded by positive charging by using the electric field applying unit and the rewritable recording medium on which a black solid image was recorded by negative charging were left for 2 months under an environment at 55% RH and 23° C. During this time, the dispersion medium was kept gelled. When the densities on the rewritable recording media after being left were measured with the portable spectrophotometer (X-RITE 939), the density of the white solid image was 0.25, and the density of the black solid image was 1.42, so that excellent image retainability was shown.

Even when an electrostatically-charged object was brought closer to the rewritable recording media, no changes in image quality and image density were observed, so that it was confirmed that image retainability was excellent against an external factor (static electricity).

Example 5

A rewritable recording medium was fabricated in the same manner as in Example 1 except that the thermoreversible gelling agent in Example 1 was replaced by a compound represented by the following structural formula (9-2).

The gel-to-sol transition temperature of isoparaffin-based hydrocarbon solvent by the action of the thermoreversible gelling agent was 51° C., and the sol-to-gel transition temperature was 18° C.

A (the number of silicon atoms)/B (the total number of amide bonds (—NHCO—) and urethane bonds (—NH-COO—) in the molecule) was 3.5.

The thermoreversible gelling agent represented by the following structural formula (9-2) was synthesized by referring to the silicone derivative synthesis method described in JP-A No. 2004-182697.

Structural formula (9-2)

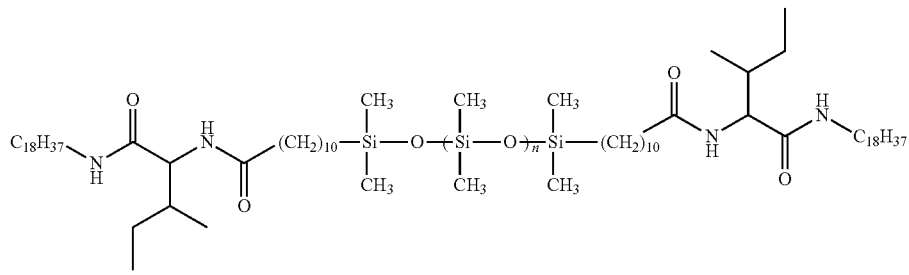

n = ca. 12-13

—Image Quality—

The fabricated rewritable recording medium was heated to 60° C. by the same heating unit as in Example 2 to convert the dispersion medium into a liquid, and further, a white solid image was recorded (image erasing) by positively charging the entire surface of the rewritable recording medium by the same electric field applying unit as in Example 2, and thereafter, when the rewritable recording medium was cooled to a room temperature, the dispersion medium turned into a gel. When the density was measured with the portable spectrophotometer (X-RITE 939 manufactured by X-Rite, Inc.), it was 0.23. Thereafter, the rewritable recording medium was heated to 60° C. again by the heating unit to convert the dispersion medium into a liquid, and in this state, a black solid image was recorded by negative charging by the electric field applying unit, and the rewritable recording medium was cooled to a room temperature. As a result, the black solid image was clearly recorded on the rewritable recording medium, and when the density was measured with the portable spectrophotometer (X-RITE 939), it was 1.42, so that it was confirmed that high contrast was obtained.

Even when an electrostatically-charged object was brought closer to the rewritable recording medium, no changes in image quality and image density were observed, so that it was confirmed that the image retainability was excellent against an external factor (static electricity). However, when an external factor was brought into contact with the rewritable recording medium without operating the cooling unit immediately after recording, a portion where inversion occurred was observed.

—Rewritability—

When the image erasing process and image recording process were alternately repeatedly applied 50 times to the rewritable recording medium in the same manner as described above, no deterioration was observed during image erasing and image recording, so that it was confirmed that repeated rewriting was possible.

—Image Retainability—

The rewritable recording medium on which a white solid image was recorded by positive charging by using the electric field applying unit and the rewritable recording medium on which a black solid image was recorded by negative charging were left for 2 months under an environment at 55% RH and 23° C. During this time, the dispersion medium was kept gelled. When the densities on the rewritable recording media after being left were measured with the portable spectrophotometer (X-RITE 939), the density of the white solid image was 0.28, and the density of the black solid image was 1.36, so that excellent image retainability was shown.

Even when an electrostatically-charged object was brought closer to the rewritable recording media, no changes in image quality and image density were observed, so that it was confirmed that image retainability was excellent against an external factor (static electricity).

Example 6

A rewritable recording medium was fabricated in the same manner as in Example 1 except that the thermoreversible gelling agent in Example 1 was replaced by a compound represented by the following structural formula (9-3).

The gel-to-sol transition temperature of isoparaffin-based hydrocarbon solvent by the action of the thermoreversible gelling agent was 49° C., and the sol-to-gel transition temperature was 14° C.

A (the number of silicon atoms)/B (the total number of amide bonds (—NHCO—) and urethane bonds (—NH-COO—) in the molecule) was 20.5.

The thermoreversible gelling agent represented by the following structural formula (9-3) was synthesized by referring to the silicone derivative synthesis method described in JP-A No. 2004-182697.

Structural Formula (9-3)

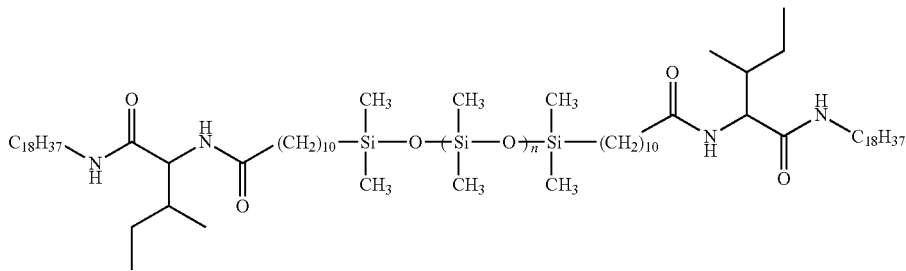

n = ca. 80

—Image Quality—

The fabricated rewritable recording medium was heated to 55° C. by the same heating unit as in Example 2 to convert the dispersion medium into a liquid, and further, a white solid image was recorded (image erasing) by positively charging the entire surface of the rewritable recording medium by the same electric field applying unit as in Example 2, and thereafter, when the rewritable recording medium was cooled to a room temperature, the dispersion medium turned into a gel. When the density was measured with the portable spectrophotometer (X-RITE 939 manufactured by X-Rite, Inc.), it was 0.22. Thereafter, the rewritable recording medium was heated to 55° C. again by the heating unit to convert the dispersion medium into a liquid, and in this state, a black solid image was recorded by negative charging by the electric field applying unit, and the rewritable recording medium was cooled to a room temperature. As a result, the black solid image was clearly recorded on the rewritable recording medium, and when the density was measured with the portable spectrophotometer (X-RITE 939), it was 1.40, so that it was confirmed that high contrast was obtained.

Even when an electrostatically-charged object was brought closer to the rewritable recording medium, no changes in image quality and image density were observed, so that it was confirmed that the image retainability was excellent against an external factor (static electricity). However, when an external factor was brought into contact with the rewritable recording medium without operating the cooling unit immediately after recording, many portions where inversion occurred were observed.

—Rewritability—

When the image erasing process and image recording process were alternately repeatedly applied 50 times to the rewritable recording medium in the same manner as described above, no deterioration was observed during image erasing and image recording, so that it was confirmed that repeated rewriting was possible.

—Image Retainability—

The rewritable recording medium on which a white solid image was recorded by positive charging by using the electric field applying unit and the rewritable recording medium on which a black solid image was recorded by negative charging were left for 2 months under an environment at 55% RH and 23° C. During this time, the dispersion medium was kept gelled. When the densities on the rewritable recording media after being left were measured with the portable spectrophotometer (X-RITE 939), the density of the white solid image was 0.36, and the density of the black solid image was 1.33, so that good image retainability was shown.

Even when an electrostatically-charged object was brought closer to the rewritable recording media, no changes in image quality and image density were observed, so that it was confirmed that image retainability was excellent against an external factor (static electricity).

Example 7

A rewritable recording medium was fabricated in the same manner as in Example 1 except that the thermoreversible gelling agent in Example 1 was replaced by a compound represented by the following structural formula (1-1).

The gel-to-sol transition temperature of isoparaffin-based hydrocarbon solvent by the action of the thermoreversible gelling agent was 97° C., and the sol-to-gel transition temperature was 62° C.

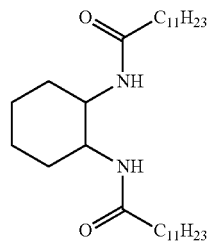

Structural formula (1-1)

—Image Quality—

The fabricated rewritable recording medium was heated to 105° C. by the same heating unit as in Example 2 to convert the dispersion medium into a liquid, and further, a white solid image was recorded (image erasing) by positively charging the entire surface of the rewritable recording medium by the same electric field applying unit as in Example 2, and thereafter, when the rewritable recording medium was cooled to a room temperature, the dispersion medium turned into a gel. When the density was measured with a portable spectrophotometer (X-RITE 939 manufactured by X-Rite, Inc.), it was 0.32. Thereafter, the rewritable recording medium was heated to 105° C. again by the heating unit to convert the dispersion medium into a liquid, and in this state, a black solid image was recorded by negative charging by the electric field applying unit, and then, the rewritable recording medium was cooled to a room temperature. As a result, the black solid image was clearly recorded on the rewritable recording medium, and when the density was measured with the portable spectrophotometer (X-RITE 939), it was 1.40, so that it was confirmed that high contrast was obtained.

Even when an electrostatically-charged object was brought closer to the rewritable recording medium, no changes in image quality and image density were observed, so that it was confirmed that the image retainability was excellent against an external factor (static electricity). Further, it was confirmed that this effect was obtained even without operating the cooling unit.

—Rewritability—

When the image erasing process and image recording process were alternately repeatedly applied 50 times to the rewritable recording medium in the same manner as described above, no deterioration was observed during image erasing and image recording, so that it was confirmed that repeated rewriting was possible. However, maybe due to the high gel-to-sol transition temperature, the heating step took time, and the recording speed slightly decreased.

—Image Retainability—

The rewritable recording medium on which a white solid image was recorded by positive charging by using the electric field applying unit and the rewritable recording medium on which a black solid image was recorded by negative charging were left for 2 months under an environment at 55% RH and 23° C. During this time, the dispersion medium was kept gelled. When the densities on the rewritable recording media after being left were measured with the portable spectrophotometer (X-RITE 939), the density of the white solid image was 0.35, and the density of the black solid image was 1.38, so that good image retainability was shown.

Even when an electrostatically-charged object was brought closer to the rewritable recording media, no changes in image quality and image density were observed, so that it was confirmed that image retainability was excellent against an external factor (static electricity).

Comparative Example 2

A rewritable recording medium was fabricated in the same manner as in Example 2 except that, in Example 2, the image recording layer forming material was replaced by the following image recording layer forming material, and the heating unit in the image recording device was set so that the surface temperature of the rewritable recording medium reached 60° C.

<Fabrication of Image Recording Layer Forming Material>

100 parts of wax (trade name: Nissan Elector WE-40 made by NOF CORPORATION), 1 part of black dye (trade name: OILBLACK HBB made by Orient Chemical Industries, Co., Ltd.), 5 parts of titanium oxide (trade name: JR-603 made by Tayca Corporation), and 0.5 parts of a surfactant (quaternary ammonium ethyl sulfate: trade name, SAT-60 made by Nihon Junyaku Co, Ltd.) were put in a polyethylene bottle, and beads (diameter: 1 mm) made of zirconia was put therein. The bottle was left for 30 minutes in a high-temperature tank set to 120° C., and thereafter, quickly transferred into a stirring machine, and stirred for 15 minutes. This operation was repeated twice, and the bottle was further left for 30 minutes at 120° C., and the mixture was taken out and extracted by mesh-filtering, whereby fabricating an image recording layer forming material.

—Image Quality—

The fabricated rewritable recording medium was heated to 70° C. by the same heating unit as in Example 2, and further, a white solid image was recorded (image erasing) by positively charging the entire surface of the rewritable recording medium by the same electric field applying unit as in Example 2. When the density on the rewritable recording medium was measured with a portable spectrophotometer (X-RITE 939 manufactured by X-Rite, Inc.), it was 0.59. Thereafter, a black solid image was recorded on the rewritable recording medium by negatively charging the rewritable recording medium in the same manner as in Example 2. When the density was measured with the portable spectrophotometer (X-RITE 939), it was 0.80, so that it was confirmed that contrast was very low and inversion hardly occurred. Thereafter, when the rewritable recording medium was heated for 20 minutes on a hot plate heated to 70° C. and then evaluated in the same manner as described above, it was found that the density of the white solid image was improved to 0.40 and the density of the black solid image was improved to 0.95.

Even when an external factor was brought into contact with the rewritable recording medium, hardly any changes in the image were observed.

—Rewritability—

When the image erasing process and the image recording process was repeatedly applied to the rewritable recording medium in the same manner as described above, clear inversion could not be observed, so that it was proved that the temperature responsiveness was low.

—Image Retainability—

The rewritable recording media inverted by heating by the above-described hot plate were left for 2 months under an environment of 55% RH and 23° C. The densities on the rewritable recording media after being left were measured with the portable spectrophotometer (X-RITE 939), and the density of the white solid image was 0.46, and the density of the black solid image was 0.93, however, an effect on image retainability was observed.

Even when an electrostatically-charged object was brought closer to the rewritable recording media, no changes in image quality and image density were observed, so that it was confirmed that image retainability was excellent against an external factor (static electricity).

Example 8

A rewritable recording medium was fabricated in the same manner as in Example 1 except that the dispersion medium in Example 1 was replaced by silicone oil (KF96-1cs made by Shin-Etsu Chemical Co., Ltd.).

The gel-to-sol transition temperature of silicone oil by the action of the thermoreversible gelling agent was 79° C., and the sol-to-gel transition temperature was 69° C.

—Image Quality—

The fabricated rewritable recording medium was heated to 85° C. by the same heating unit as in Example 2 to convert the dispersion medium into a liquid, and further, a white solid image was recorded (image erasing) by positively charging the entire surface of the rewritable recording medium by the same electric field applying unit as in Example 2, and thereafter, when the rewritable recording medium was cooled to a room temperature, the dispersion medium turned into a gel. When the density was measured with the portable spectrophotometer (X-RITE 939 manufactured by X-Rite, Inc.), it was 0.22. Thereafter, the rewritable recording medium was heated to 85° C. again by the heating unit to convert the dispersion medium into a liquid, and in this state, a black solid image was recorded by negative charging by the electric field applying unit, and the rewritable recording medium was cooled to a room temperature. As a result, the black solid image was clearly recorded on the rewritable recording medium, and when the density was measured with the portable spectrophotometer (X-RITE 939), it was 1.40, so that it was confirmed that high contrast was obtained.

Even when an electrostatically-charged object was brought closer to the rewritable recording medium, no changes in image quality and image density were observed, so that it was confirmed that the image retainability was excellent against an external factor (static electricity). Further, it was confirmed that this effect was obtained even without operating the cooling unit.

—Rewritability—

When the image erasing process and image recording process were alternately repeatedly applied 50 times to the rewritable recording medium in the same manner as described above, no deterioration was observed during image erasing and image recording, so that it was confirmed that repeated rewriting was possible.

—Image Retainability—

The rewritable recording medium on which a white solid image was recorded by positive charging by using the electric field applying unit and the rewritable recording medium on which a black solid image was recorded by negative charging were left for 2 months under an environment at 55% RH and 23° C. During this time, the dispersion medium was kept gelled. When the densities on the rewritable recording media after being left were measured with the portable spectrophotometer (X-RITE 939), the density of the white solid image was 0.25, and the density of the black solid image was 1.41, so that excellent image retainability was shown.

Even when an electrostatically-charged object was brought closer to the rewritable recording media, no changes in image quality and image density were observed, so that it was confirmed that image retainability was excellent against an external factor (static electricity).

Example 9

The rewritable recording medium fabricated in Example 1 was evaluated by using an image recording device different from that used in Example 1. This image recording device was designed so that the rewritable recording medium can be conveyed linearly, and was provided with an electric field applying unit using a charging roller, a heating unit using a thermal head, and a cooling unit using a fan. The electric field applying unit and the heating unit were installed on the surface side and the back surface side of the rewritable recording medium, respectively, so as to face each other so that the electric field applying step and the heating step were performed concurrently.

It was confirmed that a pattern image could be recorded on the rewritable recording medium by applying an electric field to the entire surface of the rewritable recording medium first, and then heating a portion corresponding to the pattern image by the thermal head. In addition, even when an electrostatically-charged object was brought closer to the rewritable recording medium, no changes in image quality and image density were observed, so that it was confirmed that image retainability was excellent against an external factor (static electricity). Further, it was also confirmed that repeated rewriting could be performed over and over by heating again.

Example 10

A rewritable recording medium was fabricated in the same manner as in Example 1 except that the black electrophoretic particles in Example 1 were replaced by black magnetic particles. This rewritable recording medium was evaluated by using an image recording device different from that used in Example 1. This image recording device was designed so that the rewritable recording medium can be conveyed linearly, and was provided with a heating unit using a thermal head, a magnetic field applying unit using a magnetic head (permanent magnet), and a cooling unit using a fan. The magnetic field applying unit and the heating unit were installed on the surface side and the back surface side of the rewritable recording medium, respectively, so as to face each other so that the magnetic field applying step and the heating step were performed concurrently.

It was confirmed that a pattern image could be recorded on the rewritable recording medium by applying a magnetic field to the entire surface of the rewritable recording medium first, and then heating a portion corresponding to the pattern image by the thermal head. In addition, even when an electrostatically-charged object was brought closer to the rewritable recording medium, no changes in image quality and image density were observed, so that it was confirmed that image retainability was excellent against an external factor (static electricity). Further, it was also confirmed that repeated rewriting could be performed over and over by heating again.

Example 11

The rewritable recording medium fabricated in Example 1 was evaluated by using an image recording device different from that used in Example 1. This image recording device was designed so that the rewritable recording medium can be conveyed linearly, and was provided with a heating unit and an electric field applying unit using an ion irradiation head. The distance between the rewritable recording medium and the ion irradiation head was set to 1 mm.

It was confirmed that a pattern image could be recorded on the rewritable recording medium by heating the entire surface of the rewritable recording medium to 60° C. by the heating unit first, and then irradiating a portion corresponding to the pattern image with an ion flow by the ion irradiation head.

In addition, even when an electrostatically-charged object was brought closer to the rewritable recording medium, no changes in image quality and image density were observed, so that it was confirmed that image retainability was excellent against an external factor (static electricity). Further, it was also confirmed that repeated rewriting could be performed over and over by heating again.

Example 12

The rewritable recording medium fabricated in Example 1 was set on a metal substrate, and the metal substrate was fixed onto a hot plate, and heated to 70° C. Further, the metal substrate and a metal stylus were connected by a power source, and while applying a voltage of −150V, the tip end of the stylus was brought into contact with the surface of the rewritable recording medium. As a result, it was confirmed that characters could be freely drawn on the rewritable recording medium.

In addition, even when an electrostatically-charged object was brought closer to the rewritable recording medium, no changes in image quality and image density were observed, so that it was confirmed that image retainability was excellent against an external factor (static electricity). Further, it was also confirmed that repeated rewriting could be performed over and over by heating again.

The rewritable recording medium according to the present invention includes image retainability, image quality, low cost, safety, and flexibility, so that it can be suitably used as a rewritable recording medium replacing paper.

Embodiments of the present invention are, for example, as follows.

<1> A rewritable recording medium including:
a base material; and
an image recording layer enclosed by the base material,
wherein the image recording layer contains:
electrophoretic particles, magnetophoretic particles, or both of the electrophoretic particles and the magnetophoretic particles;
a dispersion medium; and
a thermoreversible gelling agent, and
wherein the dispersion medium is in contact with the base material, and
wherein image recording and image erasing can be repeatedly performed on the rewritable recording medium by an external image recording device.

<2> The rewritable recording medium according to <1>, wherein the thermoreversible gelling agent contains an amide bond in the molecule thereof.

<3> The rewritable recording medium according to <1> or <2>, wherein the thermoreversible gelling agent contains a urethane bond in the molecule thereof.

<4> The rewritable recording medium according to any one of <1> to <3>, wherein the thermoreversible gelling agent contains a siloxane bond in the molecule thereof.

<5> The rewritable recording medium according to any one of <1> to <4>, wherein the thermoreversible gelling agent satisfies the following equation (I):

$$0.5 \leq A/B < 3.0 \qquad \text{Equation (I)}$$

where A denotes the number of silicon atoms contained in siloxane bonds in the molecule of the thermoreversible gelling agent and B denotes the total number of amide bonds and urethane bonds in the molecule of the thermoreversible gelling agent.

<6> The rewritable recording medium according to any one of <1> to <5>, wherein the thermoreversible gelling agent contains, in the molecule thereof, at least one of an alkyl group having 8 or more carbon atoms and an alkylene group having 8 or more carbon atoms.

<7> The rewritable recording medium according to any one of <1> to <6>, wherein the dispersion medium is at least one of an aliphatic hydrocarbon and silicone oil.

<8> The rewritable recording medium according to any one of <1> to <7>, wherein the image recording layer further includes a spacer.

<9> The rewritable recording medium according to any one of <1> to <8>, wherein the image recording layer has a cross-section in which a plurality of substantially circular shapes, a plurality of oval shapes, or a plurality of both the substantially circular shapes and the oval shapes are arranged.

<10> A method for producing the rewritable recording medium according to any one of <1> to <9>, the method including:
applying, to a first base material, an image recording layer forming material containing: electrophoretic particles, magnetophoretic particles, or both of the electrophoretic particles and the magnetophoretic particles; a dispersion medium which is in a liquid form; and a thermoreversible gelling agent, to thereby form an image recording layer; and
forming a second base material on the image recording layer formed on the first base material.

<11> The method for producing the rewritable recording medium according to any one of <1> to <9>, the method including:
mixing a dispersion liquid containing: electrophoretic particles, magnetophoretic particles, or both of the electrophoretic particles and the magnetophoretic particles; a dispersion medium; and a thermoreversible gelling agent, with a liquid that is immiscible with the dispersion medium, to thereby form gel particles of the dispersion liquid; and
applying the gel particles to a first base material to form an image recording layer and forming a second base material on the image recording layer formed on the first base material.

<12> An image recording set including:
the rewritable recording medium according to any one of <1> to <9>, and
an image recording device which includes: a heating unit configured to heat the rewritable recording medium; and at least one of an electric field applying unit configured to apply an electric field to the rewritable recording medium and a magnetic field applying unit configured to apply a magnetic field to the rewritable recording medium.

<13> The image recording set according to <12>, wherein the image recording device further includes: an image erasing unit configured to apply at least one of an electric field and a magnetic field to the rewritable recording medium, to thereby erase an image recorded on the rewritable recording medium.

<14> The image recording set according to <12> or <13>, wherein the heating unit and the electric field applying unit are an ion irradiation head including a discharge body and a heating member.

<15> The image recording set according to <12> or <13>, wherein the electric field applying unit includes an image bearing member capable of forming a latent electrostatic image thereon, and the magnetic field applying unit includes an image bearing member capable of forming a latent magnetic image thereon.

<16> An image recording method including:
heating the entirety of the image recording layer of the rewritable recording medium according to any one of <1> to <9>; and
applying at least one of an electric field and a magnetic field to at least a part of the image recording layer heated.

<17> An image recording method including:
applying at least one of an electric field and a magnetic field to the entirety of the image recording layer of the rewritable recording medium according to any one of <1> to <9>; and
heating at least a part of the image recording layer to which the at least one of the electric field and the magnetic field has been applied.

<18> The image recording method according to <16> or <17>, further including: applying at least one of an electric field and a magnetic field to the rewritable recording medium, to thereby erase an image recorded on the rewritable recording medium.

<19> The image recording method according to any one of <16> to <18>, wherein the heating and the applying the electric field are performed with an ion irradiation head including a discharge body and a heating member.

<20> The image recording method according to any one of <16> to <18>, wherein the applying the electric field is performed with an image bearing member capable of forming a latent electrostatic image thereon, and the applying the magnetic field is performed with an image bearing member capable of forming a latent magnetic image thereon.

This application claims priorities to Japanese application No. 2011-080798, filed on Mar. 31, 2011 and Japanese application No. 2012-024084, filed on Feb. 7, 2012, and incorporated herein by reference.

What is claimed is:

1. A rewritable recording medium comprising:
a base material; and
an image recording layer enclosed by the base material,
wherein the image recording layer comprises:
electrophoretic particles, magnetophoretic particles, or both electrophoretic particles and magnetophoretic particles;
a dispersion medium; and
a thermoreversible gelling agent satisfying equation (I):

$$0.5 \leq A/B < 3.0 \qquad \text{Equation (I)}$$

where A denotes the number of silicon atoms contained in siloxane bonds in the molecule of the thermoreversible gelling agent and B denotes the total number of amide bonds and urethane bonds in the molecule of the thermoreversible gelling agent,
wherein the dispersion medium is in contact with the base material, and
wherein image recording and image erasing can be repeatedly performed on the rewritable recording medium by an external image recording device.

2. The rewritable recording medium according to claim 1, wherein the thermoreversible gelling agent satisfies the following equation (I):

$$1.0 \leq A/B < 3.0 \qquad \text{Equation (I)}$$

where A denotes the number of silicon atoms contained in siloxane bonds in the molecule of the thermoreversible gelling agent and B denotes the total number of amide bonds and urethane bonds in the molecule of the thermoreversible gelling agent.

3. The rewritable recording medium according to claim 1, wherein the thermoreversible gelling agent comprises, in the molecule thereof, at least one of an alkyl group having 8 or more carbon atoms and an alkylene group having 8 or more carbon atoms.

4. The rewritable recording medium according to claim 1, wherein the dispersion medium is at least one of an aliphatic hydrocarbon and silicone oil.

5. The rewritable recording medium according to claim 1, wherein the image recording layer further comprises a spacer.

6. The rewritable recording medium according to claim 1, wherein the image recording layer has a cross-section in which a plurality of substantially circular shapes, a plurality of oval shapes, or a plurality of both the substantially circular shapes and the oval shapes are arranged.

7. An image recording method comprising:
heating the entirety of an image recording layer of a rewritable recording medium; and
applying at least one of an electric field and a magnetic field to at least a part of the image recording layer heated,
wherein the rewritable recording medium is the rewritable recording medium according to claim 1.

8. The image recording method according to claim 7, further comprising: applying at least one of an electric field and a magnetic field to the rewritable recording medium, to thereby erase an image recorded on the rewritable recording medium.

9. The image recording method according to claim 7, wherein the heating and the applying the electric field are performed with an ion irradiation head comprising a discharge body and a heating member.

10. The image recording method according to claim 7, wherein the applying the electric field is performed with an image bearing member capable of forming a latent electrostatic image thereon, and the applying the magnetic field is performed with an image bearing member capable of forming a latent magnetic image thereon.

11. An image recording set comprising:
a rewritable recording medium; and
an image recording device,
wherein the rewritable recording medium comprises: a base material; and an image recording layer enclosed by the base material,
wherein the image recording layer comprises: electrophoretic particles, magnetophoretic particles, or both electrophoretic particles and magnetophoretic particles; a dispersion medium; and a thermoreversible gelling agent satisfying equation (I):

$$0.5 \leq A/B < 3.0 \qquad \text{Equation (I)}$$

where A denotes the number of silicon atoms contained in siloxane bonds in the molecule of the thermoreversible gelling agent and B denotes the total number of amide bonds and urethane bonds in the molecule of the thermoreversible gelling agent,
wherein the dispersion medium is in contact with the base material,
wherein image recording and image erasing can be repeatedly performed on the rewritable recording medium by the image recording device, and
wherein the image recording device comprises: a heating unit configured to heat the rewritable recording medium; and at least one of an electric field applying unit configured to apply an electric field to the rewritable recording medium and a magnetic field applying unit configured to apply a magnetic field to the rewritable recording medium.

12. The image recording set according to claim 11, wherein the image recording device further comprises: an image erasing unit configured to apply at least one of an electric field and a magnetic field to the rewritable recording medium, to thereby erase an image recorded on the rewritable recording medium.

13. The image recording set according to claim 11, wherein the heating unit and the electric field applying unit are an ion irradiation head comprising a discharge body and a heating member.

14. The image recording set according to claim 11, wherein the electric field applying unit comprises an image bearing member capable of forming a latent electrostatic image thereon, and the magnetic field applying unit comprises an image bearing member capable of forming a latent magnetic image thereon.

15. A rewritable recording medium comprising:
a base material; and
an image recording layer enclosed by the base material,
wherein the image recording layer comprises:
electrophoretic particles, magnetophoretic particles, or both electrophoretic particles and magnetophoretic particles;
a dispersion medium; and
a thermoreversible gelling agent comprising, in the molecule thereof:
at least one of an amide bond and a urethane bond;
a siloxane bond; and
at least one of an alkyl group having 8 or more carbon atoms and an alkylene group having 8 or more carbon atoms, and
wherein the dispersion medium is in contact with the base material, and
wherein image recording and image erasing can be repeatedly performed on the rewritable recording medium by an external image recording device.

* * * * *